United States Patent
Kishiyama et al.

(10) Patent No.: US 8,274,879 B2
(45) Date of Patent: Sep. 25, 2012

(54) TRANSMISSION APPARATUS AND TRANSMISSION METHOD

(75) Inventors: Yoshihisa Kishiyama, Yokosuka (JP);
Nobuhiko Miki, Yokohama (JP);
Kenichi Higuchi, Saitama (JP);
Motohiro Tanno, Yokohama (JP);
Hiroyuki Atarashi, Yokohama (JP);
Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 13/315,319

(22) Filed: Dec. 9, 2011

(65) Prior Publication Data

US 2012/0082261 A1 Apr. 5, 2012

Related U.S. Application Data

(63) Continuation of application No. 13/108,622, filed on May 16, 2011, which is a continuation of application No. 11/910,246, filed as application No. PCT/JP2006/305499 on Mar. 20, 2006.

(30) Foreign Application Priority Data

Apr. 1, 2005 (JP) .................................. 2005-106908
Jan. 17, 2006 (JP) .................................. 2006-009299
Feb. 8, 2006 (JP) .................................. 2006-031750

(51) Int. Cl.
*H04J 9/00* (2006.01)

(52) U.S. Cl. ........................................ 370/204; 370/205

(58) Field of Classification Search .......... 370/203–205, 370/208, 215, 465, 230, 437, 468; 375/259–267
See application file for complete search history.

(56) References Cited

U.S. PATENT DOCUMENTS

| | | | |
|---|---|---|---|
| 5,542,113 A | 7/1996 | Fink et al. | |
| 6,226,337 B1 | 5/2001 | Klank et al. | |
| 7,317,750 B2 * | 1/2008 | Shattil | 375/146 |
| 7,535,869 B2 | 5/2009 | Yoon et al. | |
| 7,693,224 B2 | 4/2010 | Rhodes | |
| 7,782,896 B2 | 8/2010 | Kuri et al. | |
| 7,965,793 B2 * | 6/2011 | Golitschek Edler Von Elbwart et al. | 375/308 |
| 8,098,623 B2 * | 1/2012 | Ramesh et al. | 370/329 |

(Continued)

FOREIGN PATENT DOCUMENTS

EP 1551115 A1 7/2005

(Continued)

OTHER PUBLICATIONS

Japanese Office Action for Application No. 2009-191406 mailed on Oct. 18, 2011 (6 pages).

(Continued)

*Primary Examiner* — Chuong T Ho
(74) *Attorney, Agent, or Firm* — Osha Liang LLP

(57) ABSTRACT

A transmitter transmits data to a communicating opponent with a better channel condition with use of one or more frequency blocks including one or more carrier frequencies. The transmitter includes a communicating opponent selection unit evaluating the channel condition for each frequency block for each of plural communicating opponents and selecting one or more communicating opponents from the plurality of communicating opponents, a modulation scheme determination unit determining at least a modulation scheme depending on the evaluated channel condition, a control channel generation unit generating a control channel indicative of the determined modulation scheme and one or more frequency blocks available for the selected communicating opponents to receive a data channel, and a channel transmission unit providing the selected communicating opponents with the control channel and the data channel modulated in accordance with the modulation scheme.

4 Claims, 41 Drawing Sheets

U.S. PATENT DOCUMENTS

| | | | |
|---|---|---|---|
| 2003/0016622 A1 | 1/2003 | McCarty | |
| 2003/0060173 A1 | 3/2003 | Lee et al. | |
| 2004/0086027 A1* | 5/2004 | Shattil | 375/146 |
| 2004/0252632 A1 | 12/2004 | Bourdoux et al. | |
| 2005/0009532 A1 | 1/2005 | Cuffaro et al. | |
| 2005/0068884 A1 | 3/2005 | Yoon et al. | |
| 2005/0122898 A1 | 6/2005 | Jang et al. | |
| 2005/0180354 A1 | 8/2005 | Cho et al. | |
| 2005/0185722 A1 | 8/2005 | Abe et al. | |
| 2005/0207367 A1 | 9/2005 | Onggosanusi et al. | |
| 2005/0265469 A1 | 12/2005 | Aldana et al. | |
| 2006/0121946 A1 | 6/2006 | Walton et al. | |
| 2006/0209970 A1 | 9/2006 | Kanterakis | |
| 2006/0222091 A1 | 10/2006 | Rhodes | |
| 2007/0058595 A1 | 3/2007 | Classon et al. | |
| 2007/0064669 A1 | 3/2007 | Classon et al. | |
| 2009/0109999 A1 | 4/2009 | Kuri et al. | |
| 2009/0185577 A1* | 7/2009 | Kishiyama et al. | 370/465 |
| 2011/0216849 A1* | 9/2011 | Kishiyama et al. | 375/295 |

FOREIGN PATENT DOCUMENTS

| | | |
|---|---|---|
| JP | 11-145929 A | 5/1999 |
| JP | 11-178050 A | 7/1999 |
| JP | 2002-524939 A | 8/2002 |
| JP | 2003-101499 A | 4/2003 |
| JP | 2003-169036 | 6/2003 |
| JP | 2004-072251 A | 3/2004 |
| JP | 2004-135304 A | 4/2004 |
| JP | 2004-208234 A | 7/2004 |
| JP | 2004-248005 | 9/2004 |
| JP | 2004-304760 | 10/2004 |
| JP | 2004-312291 A | 11/2004 |
| JP | 2005-064961 A | 3/2005 |
| JP | 2005-80046 | 3/2005 |
| JP | 2007-221178 A | 8/2007 |
| TW | 259401 | 3/2005 |
| WO | 0013427 A2 | 3/2000 |
| WO | 03058871 A1 | 7/2003 |
| WO | 2004032375 A1 | 4/2004 |
| WO | 2004102863 A1 | 11/2004 |

OTHER PUBLICATIONS

Patent Abstracts of Japan for Japanese Publication No. 2005-064961, publication date Mar. 10, 2005 (1 page).

Patent Abstracts of Japan for Japanese Publication No. 2004-135304, publication date Apr. 30, 2004 (1 page).

Kiyomichi Araki et al., "MIMO-OFDM Eigenmode Adaptive Transmission System: System Performance of Hierarchical Subgroup Power and Modulation Coding Adaptation", IEICE Technical Report, Japan, Oct. 21, 2004, vol. 104, No. 398, pp. 99-104, RCS2004-170.

Japanese Office Action for Application No. 2006-031750, mailed on Jan. 4, 2012 (3 pages).

esp@cenet Patent Abstract for WO 2004/032375, publication date Apr. 15, 2004. (1 page).

Japanese Office Action for Application No. 2009-191406, mailed on Mar. 21, 2012 (3 pages).

Takashi Bada et al., "A Study on Block Control Applied Multilevel Transmit Power Control Scheme for OFDM based Adaptive Modulation Systems", Transactions of the Conference of IEICE in 2003, Mar. 3, 2003, Communication 1, B-5-88.

Takashi Bada et al, "A Study on Block Controlled Multilevel Transmit Power Control Scheme using Carrier Hole Control Techniques for OFDM based Adaptive Modulation Scheme", IEICE Technical Report, Jan. 9, 2004, vol. 103, No. 550, pp. 11-16, RCS 2003-279.

Toyoki Ue, et al., "Symbol Rate and Modulation Level-Controlled Adaptive Modulation/TDMA/TDD System for High-Bit-Rate Wireless Data Transmission," IEEE Trans. VT, pp. 1134-1147, vol. 47, No. 4, Nov. 1998, 27 pages.

S. Lin, et al., "Automatic-Repeat-Request Error-Control Schemes," IEEE Communication Magazine, vol. 12, No. 12, pp. 5-17, Dec. 1984, 13 pages.

International Search Report issued in PCT/JP2006/305499 dated Apr. 25, 2006, with English translation, 5 pages.

Taiwanese Office Action for Taiwanese Application No. 095110100, mailed on May 30, 2008 (26 pages).

esp@cenet patent abstract for Taiwanese Publication No. 259401, Publication Date Mar. 11, 2005 (1 page).

Japanese Office Action for Application No. 2006-031750, mailed on May 17, 2011 (6 pages).

Patent Abstracts of Japan for Japanese Publication No. 2004-072251, publication date Mar. 4, 2004 (1 page).

Patent Abstracts of Japan for Japanese Publication No. 11-145929, publication date May 28, 1999 (1 page).

Patent Abstracts of Japan for Japanese Publication No. 11-178050, publication date Jul. 2, 1999 (1 page).

Patent Abstracts of Japan for Japanese Publication No. 2003-101499, publication date Apr. 4, 2003 (1 page).

Kshirasagar Naik et al., "A Reservation Based Medium Access Control Protocol with Multicast Support for Optical Star Networks", Aug. 9, 2002.

U.S. Appl. No. 60/666,464, filed Mar. 30, 2005.

Japanese Office Action for Application No. 2009-191406, mailed on Jun. 21, 2011 (6 pages).

Patent Abstracts of Japan for Japanese Publication No. 2007-221178, publication date Aug. 30, 2007 (1 page).

Patent Abstracts of Japan for Japanese Publication No. 2004-312291, publication date Nov. 4, 2004(1 page).

Japanese Office Action for Application No. 2006-031750, mailed on Oct. 4, 2011 (6 pages).

Ericsson, "E-UTRA Downlink Radio Access" TSG-RAN WG1 Ad Hoc on LTE, R1-050619, Jun. 20-21, 2005, Sopia Antipolis, France.

* cited by examiner

| MCS NUMBERS | DATA MODULATIONS | CHANNEL CODING RATES | RELATIVE INFORMATION BIT RATES |
|---|---|---|---|
| MCS1 | QPSK | 1/3 | 1 |
| MCS2 | QPSK | 1/2 | 1.5 |
| MCS3 | QPSK | 2/3 | 2 |
| MCS4 | QPSK | 6/7 | 2.57 |
| MCS5 | 16QAM | 1/2 | 3 |
| MCS6 | 16QAM | 2/3 | 4 |
| MCS7 | 16QAM | 3/4 | 4.5 |
| MCS8 | 16QAM | 5/6 | 5 |
| MCS9 | 16QAM | 6/7 | 5.24 |
| MCS10 | 16QAM | 8/9 | 5.33 |

RECEPTION SIR ↓

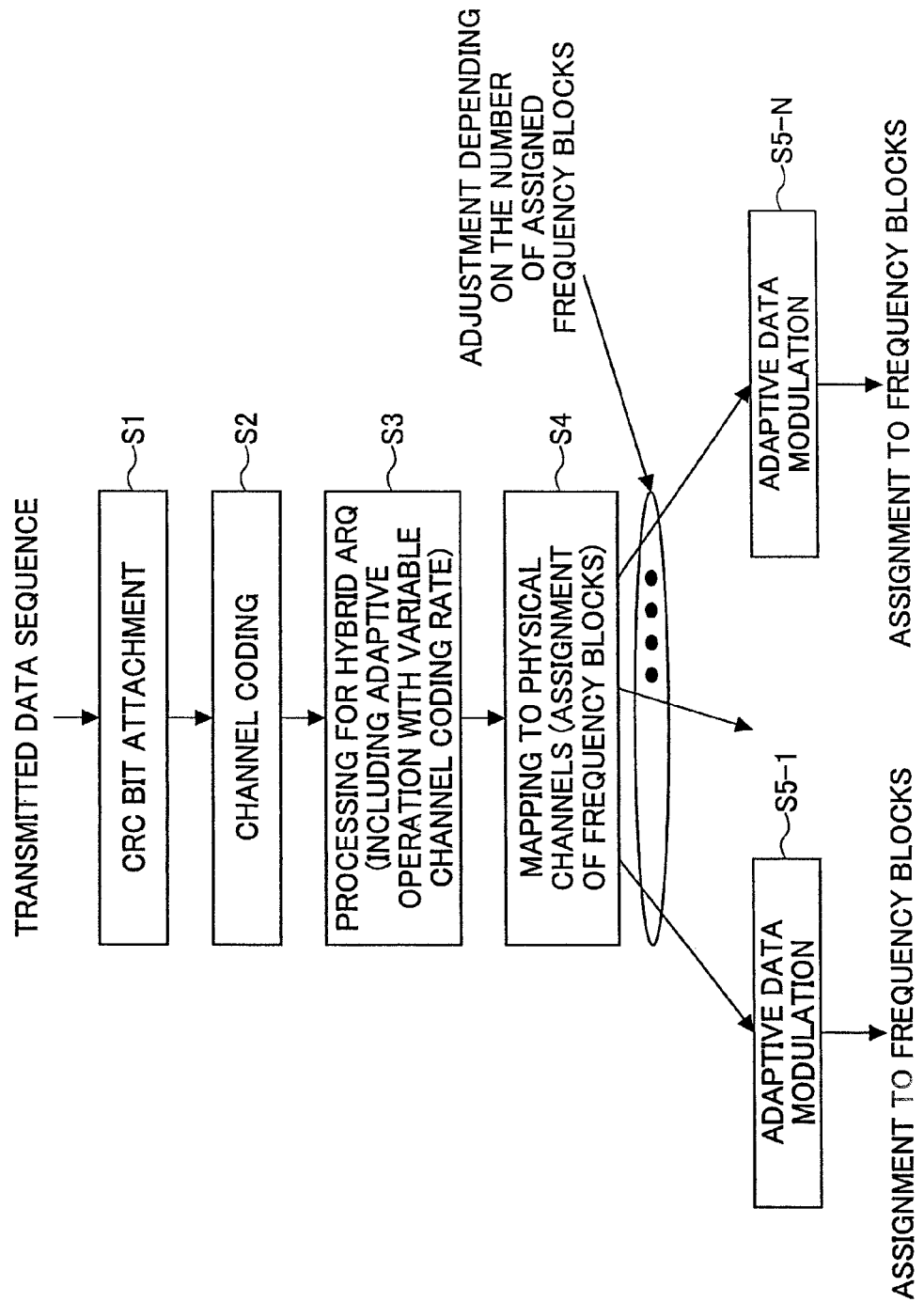

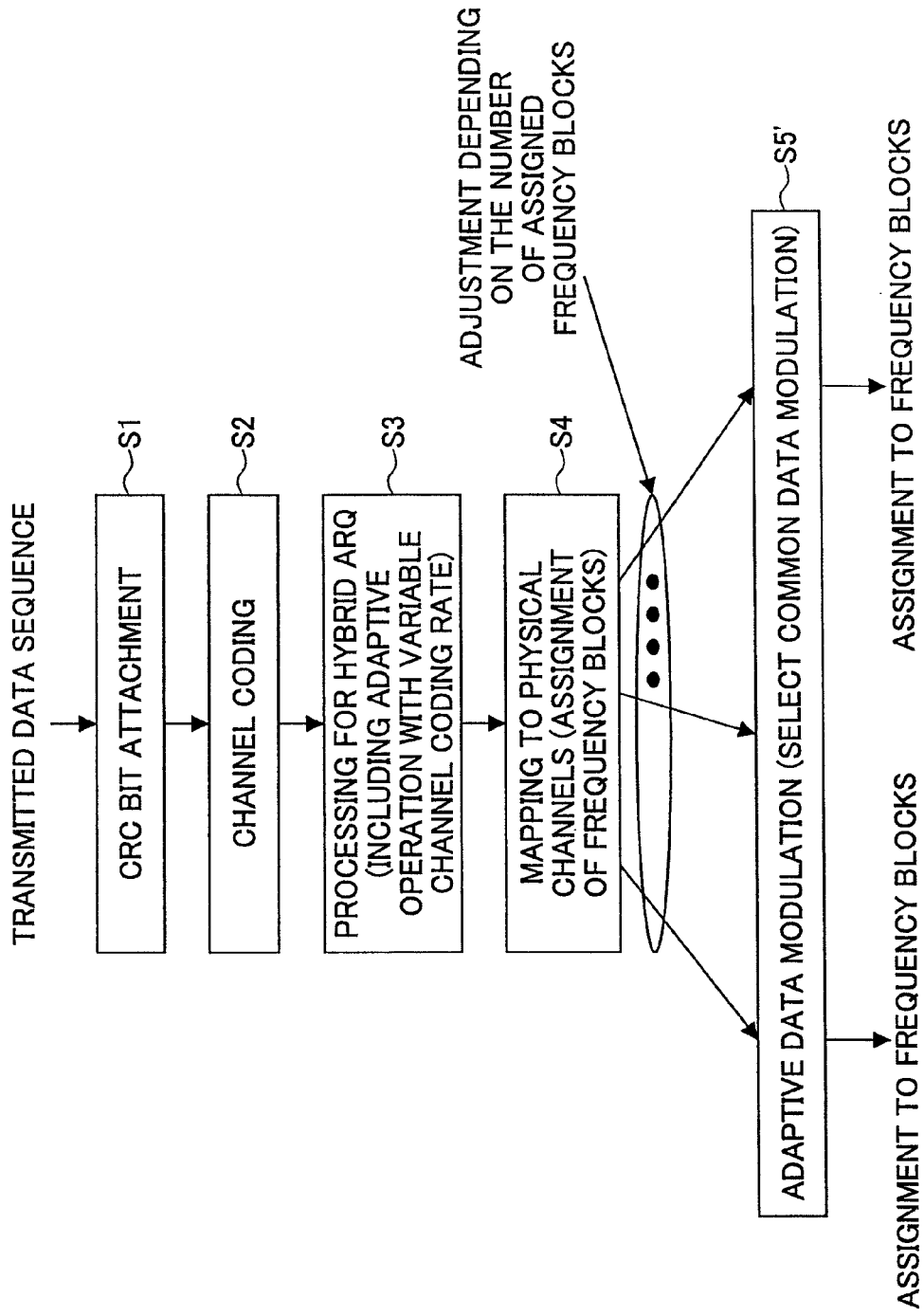

FIG.13

| FIELD NAMES | TYPES OF CONTROL INFORMATION | REQUIREMENT FOR REPORTING PER FREQUENCY BLOCK |
|---|---|---|
| CHUNK ALLOCATION INFORMATION | CONTROL INFORMATION OVER PHYSICAL LAYER | NOT REQUIRED |
| MODULATION SCHEME INFORMATION | CONTROL INFORMATION OVER PHYSICAL LAYER | REQUIRED/ NOT REQUIRED |
| CODING RATE INFORMATION | CONTROL INFORMATION OVER LAYER 2 | REQUIRED/ NOT REQUIRED |
| HYBRID ARQ PROCESS INFORMATION | CONTROL INFORMATION OVER LAYER 2 | REQUIRED/ NOT REQUIRED |
| REDUNDANCY VERSION | CONTROL INFORMATION OVER LAYER 2 | REQUIRED/ NOT REQUIRED |
| PACKET STATUS INFORMATION | CONTROL INFORMATION OVER LAYER 2 | REQUIRED/ NOT REQUIRED |
| UE IDENTITY | CONTROL INFORMATION OVER PHYSICAL LAYER | NOT REQUIRED |

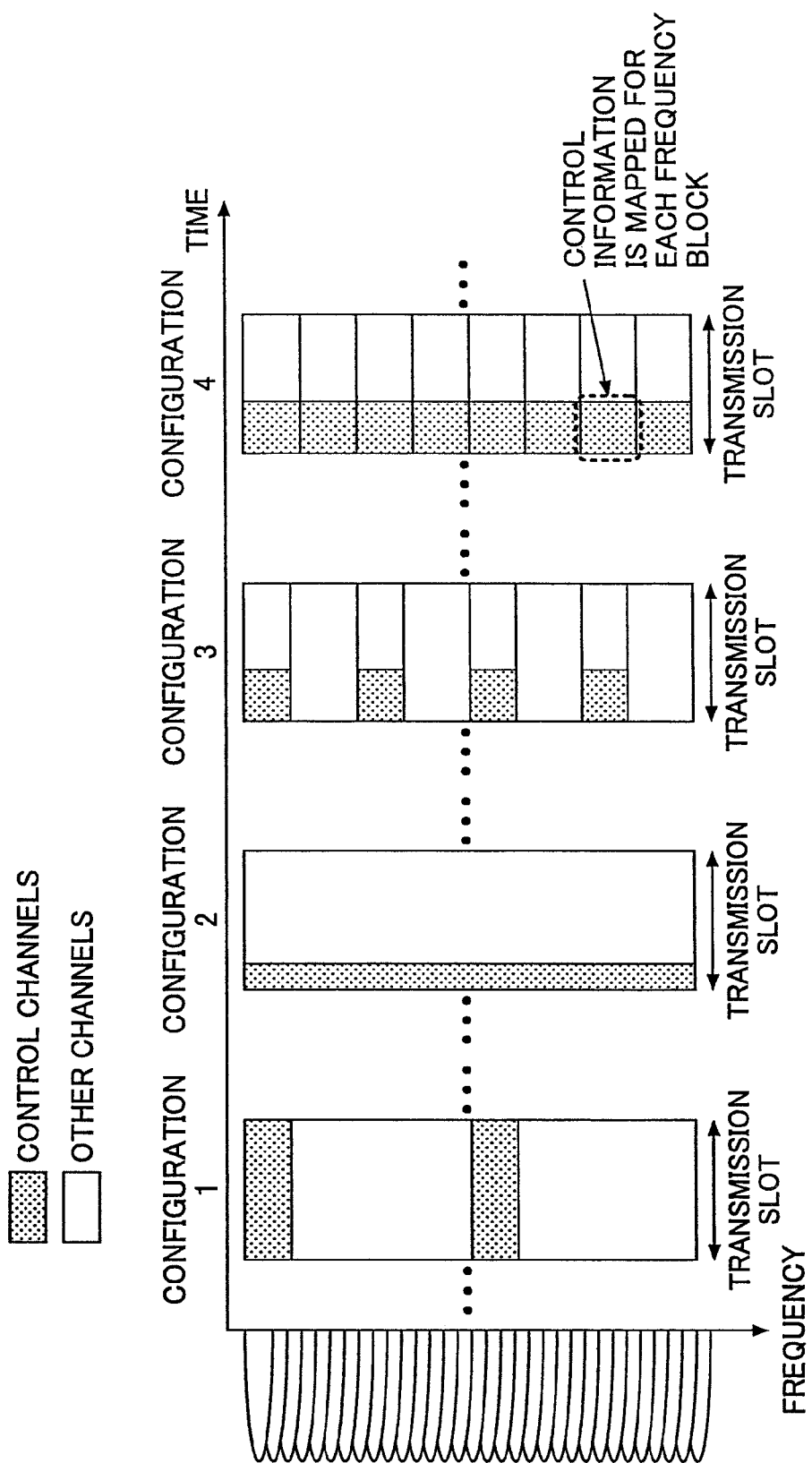

FIG.18

| METHODS | FREQUENCY RANGE SCHEDULING | DATA MODULATION | CHANNEL CODING RATES | HYBRID ARQ | CHARAC-TERISTICS | OVERHEAD |
|---|---|---|---|---|---|---|
| METHOD 1 | PER FREQUENCY BLOCK | PER FREQUENCY BLOCK | PER FREQUENCY BLOCK | PER FREQUENCY BLOCK | ◎ | × |
| METHOD 2 | PER FREQUENCY BLOCK | PER FREQUENCY BLOCK | PER TTI | PER FREQUENCY BLOCK | ◎ | × |
| METHOD 3 | PER FREQUENCY BLOCK | PER FREQUENCY BLOCK | PER PACKET | PER FREQUENCY BLOCK | ◎ | × |
| METHOD 4 | PER FREQUENCY BLOCK | PER FREQUENCY BLOCK | PER FREQUENCY BLOCK | PER PACKET | ○ | △ |
| METHOD 5 | PER FREQUENCY BLOCK | PER FREQUENCY BLOCK | PER TTI | PER PACKET | ○ | △ |
| METHOD 6 | PER FREQUENCY BLOCK | PER FREQUENCY BLOCK | PER PACKET | PER PACKET | ○ | △ |
| METHOD 7 | PER FREQUENCY BLOCK | PER FREQUENCY BLOCK | PER FREQUENCY BLOCK | PER TTI | △ | ○ |
| METHOD 8 | PER FREQUENCY BLOCK | PER FREQUENCY BLOCK | PER TTI | PER TTI | △ | ○ |
| METHOD 9 | PER FREQUENCY BLOCK | PER FREQUENCY BLOCK | PER PACKET | PER TTI | △ | ○ |
| METHOD 10 | PER FREQUENCY BLOCK | PER TTI | PER TTI | PER TTI | × | ◎ |

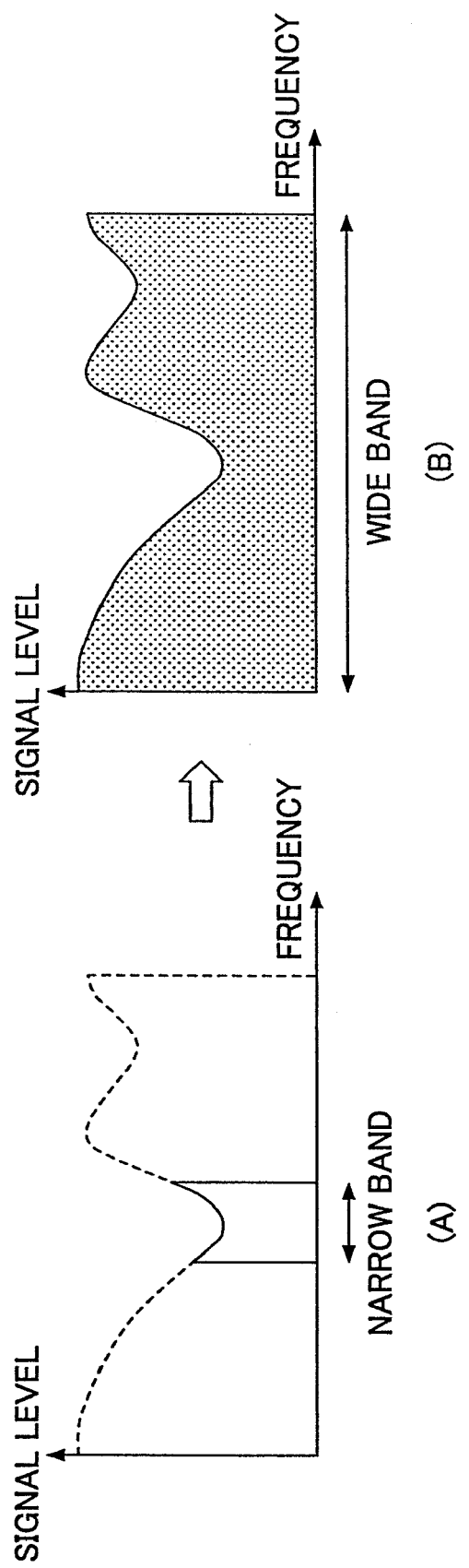

FIG.33

| DATA MODULATIONS | TRANSMISSION POWER |
|---|---|
| QPSK | $P_1$ |
| 16QAM | $P_2$ |
| 64QAM | $P_3$ |
| ⋮ | ⋮ |
| NO TRANSMISSION | 0 |

FIG.34

| MCS NUMBERS | DATA MODULATIONS | CHANNEL CODING RATES | TRANSMISSION POWER |
|---|---|---|---|
| MCS1 | QPSK | 1/3 | $P_1$ |
| MCS2 | QPSK | 1/2 | $P_2$ |
| MCS3 | QPSK | 2/3 | $P_3$ |
| MCS4 | QPSK | 6/7 | $P_4$ |
| MCS5 | 16QAM | 1/2 | $P_5$ |
| ⋮ | ⋮ | ⋮ | ⋮ |
| NO TRANSMISSION | | | 0 |

TRANSMISSION APPARATUS AND TRANSMISSION METHOD

CROSS REFERENCE TO RELATED APPLICATIONS

This is a continuation application of U.S. patent application Ser. No. 13/108,622 filed May 16, 2011, which is a continuation of U.S. patent application Ser. No. 11/910,246 filed Sep. 28, 2007, which is a national stage application of PCT/JP2006/305499 filed Mar. 20, 2006, which claims priority to JP2006/031750 filed Feb. 8, 2006, JP2006/009299 filed Jan. 17, 2006, and JP2005/106908 filed Apr. 1, 2005.

TECHNICAL FIELD

The present invention relates to the technical field of radio communication. More specifically, the present invention relates to a transmission apparatus and a transmission method for use in a communication system for scheduling packets on a downlink.

BACKGROUND ART

In the third generation communication scheme, typically IMT-2000 (International Mobile Telecommunications-2000), the information transmission rate higher than 2 Mbps is implemented with use of 5 MHz frequency band in the downlink. In the IMT-2000, the single-carrier type W-CDMA (Wideband-CDMA) scheme is adopted. In addition, AMC (Adaptive Modulation and channel Coding) scheme, ARQ (Automatic Repeat Request) scheme for packets in the MAC layer, fast packet scheduling, and others are employed for HSDPA (High Speed Downlink Packet Access) in order to achieve higher. transmission rates and quality. For example, non-patent document 1 describes the AMC scheme, and non-patent document 2 describes the ARQ scheme.

FIG. 1 is a schematic view illustrating the AMC scheme. Assuming that transmission power from a base station is constant, in general, it is estimated that a terminal 11 closer to a base station 10 can receive signals with greater power than a terminal 12 farther from the base station 10 can. Thus, since it is estimated that the terminal 11 may have better channel conditions, a greater modulation level and a higher coding rate are adopted. On the other hand, the terminal 12 can receive signals with less power than the terminal 11. As a result, since it is estimated that the terminal 12 may have worse channel conditions, a smaller modulation level and a lower coding rate are adopted.

FIG. 2 shows an exemplary combination of different modulation schemes (modulation level) and different channel coding rates. In the illustrated table, the rightmost column represents relative bit rates in the case of the bit rate being "1" under the modulation scheme M of "QPSK" and the channel coding rate R of "⅓". For example, if M="QPSK" and R="½", the bit rate of ×1.5 is obtained. In general, there is a tendency that the higher the bit rate is, the less the reliability is. More specifically, combinations between different modulation schemes and the coding rates and different amounts indicative of channel states are predefined in a listing table, and the modulation schemes and others are changed depending on the channel state if needed. The amount indicative of the channel state is managed as Channel Quality Indicator (CQI), which is typically SIR (Signal to Interference power Ratio) and SINR of a received signal.

FIG. 3 is a schematic view for explaining the ARQ (more accurately, hybrid ARQ). The hybrid ARQ scheme is a technique derived from a combination of the ARQ scheme of requesting retransmission of packets depending on results of error detection (CRC: Cyclic Redundancy Check) and some error correction coding scheme (also referred to as channel coding) for error correction. As illustrated, a CRC bit is added to a transmission data sequence S1), and the resulting signal is sent after completion of error correction encoding (S2). In response to receipt of the signal, error correction decoding (also referred to as "channel decoding") is carried out (S3), and error detection is carried out (S4). If some error is detected, retransmission of the packet is requested to the transmitting side (S5). As illustrated in FIG. 4, there are several methods for such retransmission.

In an exemplary method illustrated in FIG. 4A, packet P1 is sent from the transmitting side to the receiving side. If some error is detected at the receiving side, the packet P1 is discarded and then the retransmission is requested. In response to the retransmission request, the transmitting side resends the same packet (represented as "P2") as the packet P1.

In an exemplary method illustrated in FIG. 4B, packet P1 is sent from the transmitting side to the receiving side. If some error is detected at the receiving side, the receiving side keeps the packet P1 without discarding it. In response to the retransmission request, the transmitting side resends the same packet (represented as "P2") as the packet P1. Then, the receiving side generates packet P3 by combining the previously received packet with the currently received packet. Since the packet P3 corresponds to one transmitted with double the power of packet P1, the demodulation accuracy is improved.

Also in an exemplary method illustrated in FIG. 4C, packet P1 is sent from the transmitting side to the receiving side. If some error is detected at the receiving side, the receiving side keeps the packet P1 without discarding it. In response to the retransmission request, the transmitting side sends redundancy data derived by performing certain operations on the packet P1 as packet P2. For example, assume that a sequence of packets such as "P1, P1', P1", . . . " has been derived by encoding the packet P1. The derived sequence is predefined as a "puncture pattern", and may differ depending on the adopted coding algorithms. In the illustrated example, in response to receipt of a retransmission request, the transmitting side sends P1' as packet P2. The receiving side generates packet P3 by combining the previously received packet with the currently received packet. Since the packet P3 has increased redundancy, the demodulation accuracy will be improved. For example, assuming that the coding rate of the packet P1 is equal to "½", the coding rate of the packet P3 becomes equal to "¼", thereby resulting in improved reliability. Note that the receiving side must already know some information as to what coding algorithm is adopted, what redundancy data are sent (puncture pattern), and others.

Fast packet scheduling scheme is a technique intended to improve frequency utilization efficiency in downlink. In a mobile communication environment, the channel condition between a mobile station (user) and a base station varies over time. In this case, even though transmission of a large amount of data to a user with a poor channel condition is attempted, it is hard to improve the throughput. On the other hand, the higher throughput would be achieved for a user with a good channel condition. From such a viewpoint, it is possible to improve the frequency utilization efficiency by determining whether the channel condition is good for each user and assigning a shared data packet in favor of the user with the better channel condition.

FIG. 5 is a schematic diagram for explaining the fast packet scheduling scheme. As illustrated, a shared data packet is assigned to a user with the better channel condition (a user associated with greater SINR) in each time slot. As illustrated in FIG. 6, plural codes may be used to multiplex data destined for different users within a single time slot (frame) in assignment of a shared data packet. In the illustrated example, codes #1-#10 are used, and in the third frame of five frames, two types of data are multiplexed for user #1 and user #2.

Non-patent document 1: T. Ue, S. Aampei, N. Morinaga and K. Hamaguchi, "Symbol Rate and Modulation Level-Controlled Adaptive Modulation/TDMA/TDD System for High-Bit-Rate Wireless Data Transmission", IEEE Trans. VT, pp. 1134-1147, vol. 47, No. 4, November 1998

Non-patent document 2: S. Lin, Costello, Jr. and M. Miller, "Automatic-Repeat-Request Error Control Schemes", IEEE Communication Magazine, vol. 12, No. 12, pp. 5-17, December 1984

DISCLOSURE OF INVENTION

Problem to be Solved by the Invention

In this technical field, there is a strong need for improved speed and capacity of radio transmission, and in a future communication system, it may be required to use a wider frequency band than in current systems. However, the wider is the frequency band is used for radio communication, the more adverse are the frequency selective fading effects due to multipath fading. FIG. 19 schematically shows the reception level of a signal affected by the frequency selective fading. As illustrated in FIG. 19A, if a relatively narrow frequency band is used for radio transmission, the reception level within the frequency band can be considered to be constant. As illustrated in FIG. 19B, on the other hand, if a wider frequency band is used, the reception level shows significant frequency dependence. Hence, it may be advantageous for improvement of speed and capacity to divide the entire radio band into plural frequency blocks and apply AMC, ARQ and packet scheduling for each frequency block. In the case where these controls are totally carried out in minimum data units, however, a large number of control signals are required, and data transmission efficiency may become worse.

One object of the present invention is to provide a transmission apparatus and a transmission method enabling control signals required for improved frequency utilization efficiency to be transmitted efficiently in a communication system where data transmission is carried out in favor of a communicating opponent with a better channel condition.

Means for Solving the Problem

In order to solve the problem, the present invention relates to a transmitter transmitting data to a communicating opponent with a better channel condition with use of one or more frequency blocks including one or more carrier frequencies. The transmitter includes a communicating opponent selection unit evaluating channel condition for each frequency block for each of plural communicating opponents and selecting one or more communicating opponents from the plural communicating opponents, a modulation scheme determination unit determining at least a modulation scheme depending on the evaluated channel condition, a control channel generation unit generating a control channel indicative of the determined modulation scheme and one or more frequency blocks available for the selected communicating opponents to receive a data channel, and a channel transmission unit providing the selected communicating opponents with the control channel and the data channel modulated in accordance with the modulation scheme.

Advantage of the Invention

According to the embodiment of the present invention, frequency utilization efficiency can be improved in systems for transmitting data to a communicating opponent with a better channel condition.

BRIEF DESCRIPTION OF DRAWINGS

FIG. 12B is a flowchart (1) for explaining the transmission procedure in detail;

FIG. 12C is a flowchart (2) for explaining the transmission procedure in detail;

FIG. 13 shows an exemplary table where contents of control information are listed;

FIG. 14 is a diagram illustrating several examples for illustrating mapping control information and the other information in a downlink physical channel;

FIG. 18 shows an exemplary table for comparing different transmission schemes;

FIG. 19 is a schematic diagram illustrating exemplary frequency selective fading;

FIG. 33 is a diagram illustratively showing an exemplary correspondence between different modulation schemes and different transmission power levels;

FIG. 34 is a diagram illustratively showing an exemplary correspondence between different MCS numbers and different transmission power levels;

LIST OF REFERENCE SYMBOLS

Figure 1:
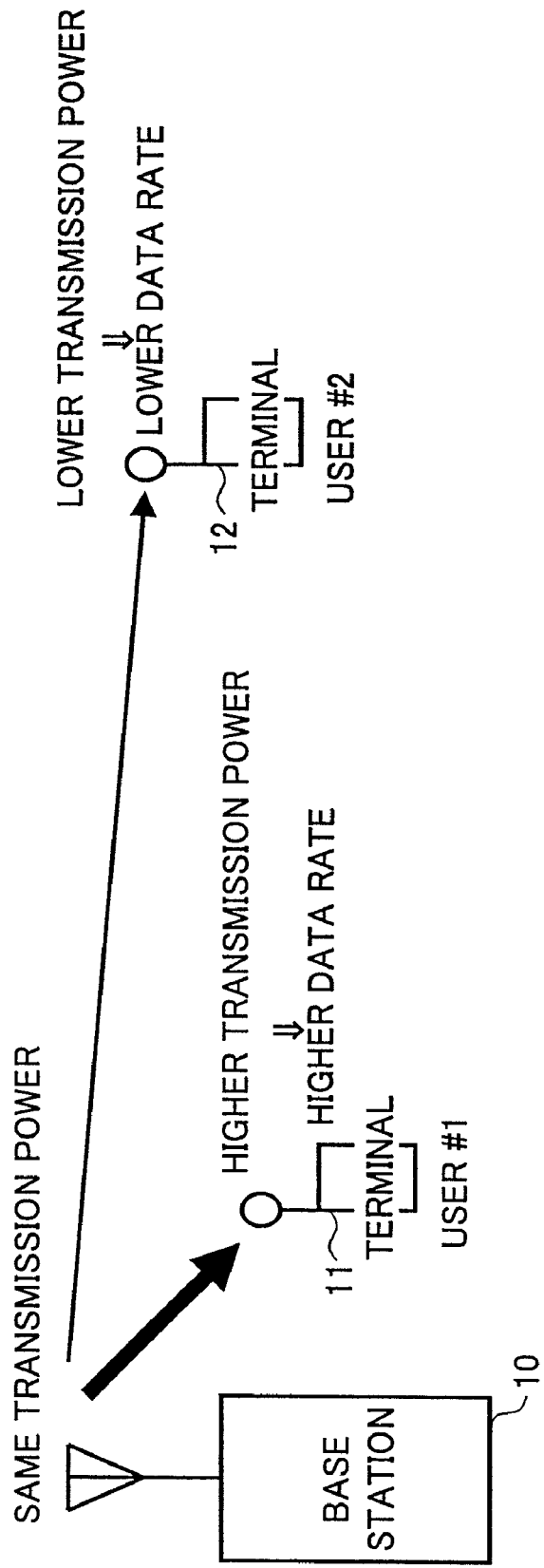
FIG. 1 is a schematic view for explaining the AMC scheme.

10: base station
11, 12: terminal
702: radio resource assignment unit
704: inverse fast Fourier transform unit
706: guard interval insertion unit
720: common control channel processing unit
740: shared control channel processing unit
760: shared data channel processing unit
761: packet scheduling unit
722, 742, 762: channel coding unit
724, 744, 764: data modulation unit
726, 746, 747, 766: data spreading unit
745: control information division, unit
768: power control unit

BEST MODE FOR CARRYING OUT THE INVENTION

In one embodiment of the present invention, the channel condition on each of plural communicating opponents is evaluated for each frequency block. Based on the evaluation, one or more communicating opponents are selected, and at least a modulation scheme is determined depending on the evaluated channel condition. Then, a control channel is generated for indicating the determined modulation scheme and one or more frequency blocks available for the selected communicating opponents to receive data, and the control channel and a data channel modulated in accordance with the determined modulation scheme are provided or transmitted to the selected communicating opponents. The modulation scheme is allowed to be identified with a lesser number of bits, resulting in a considerable influence on data transmission efficiency. As a result, it is possible to transmit control information to a mobile station efficiently and thus further improve frequency utilization efficiency in a communication system that uses a wider frequency band for packet scheduling and AMC control.

The channel coding rate may be determined depending on the channel condition for each frequency block. Also, a data channel and a control channel, which have been modulated in accordance with the determined modulation scheme and encoded at the channel coding rate, may be provided or transmitted. The channel coding rate may be determined for each frequency block. As a result, AMC can be carried out for each frequency block.

From the viewpoint of control simplification, the channel coding rate may be set to a uniform value over plural frequency blocks. The reason is that the channel coding rate has less influence on data transmission efficiency than modulation level.

Reception means for receiving a transmission request for data from a communicating opponent may be provided in a transmitter, and transmission means may retransmit data in response to a retransmission request. The retransmission of data in response to the retransmission request may be carried out for each frequency block. As a result, retransmission control is achieved for each frequency block.

Error correction coding means for performing error correction coding on a control channel may be provided for hybrid ARQ. The error correction coding may be performed for the control channel for each frequency block from the viewpoint of reduced error occurrence.

Among control channels, control information on a physical layer and control information on some layers above the physical layer may be error correction encoded separately.

In order to address some problems such as that a communicating opponent may perform unsuitable operation inadvertently, data transmitted from the transmission means may include an error detection code for control information. An error detection code may be attached to two types of control information for the physical layer and its upper layer separately.

[First Embodiment]

Although systems adopting the OFDM (Orthogonal Frequency Division Multiplexing) scheme in the downlink are focused on in an embodiment presented below, the present invention may be applied to other multicarrier types of systems. A wide downlink frequency band may be divided into plural frequency blocks. A single frequency block may generally include one or more carriers. It is assumed in this embodiment that plural subcarriers are included in each frequency block. Such a frequency block may be also referred to as a resource block or a chunk. A frequency block or a chunk may be used as unit of assignment of radio resources.

Figure 7:
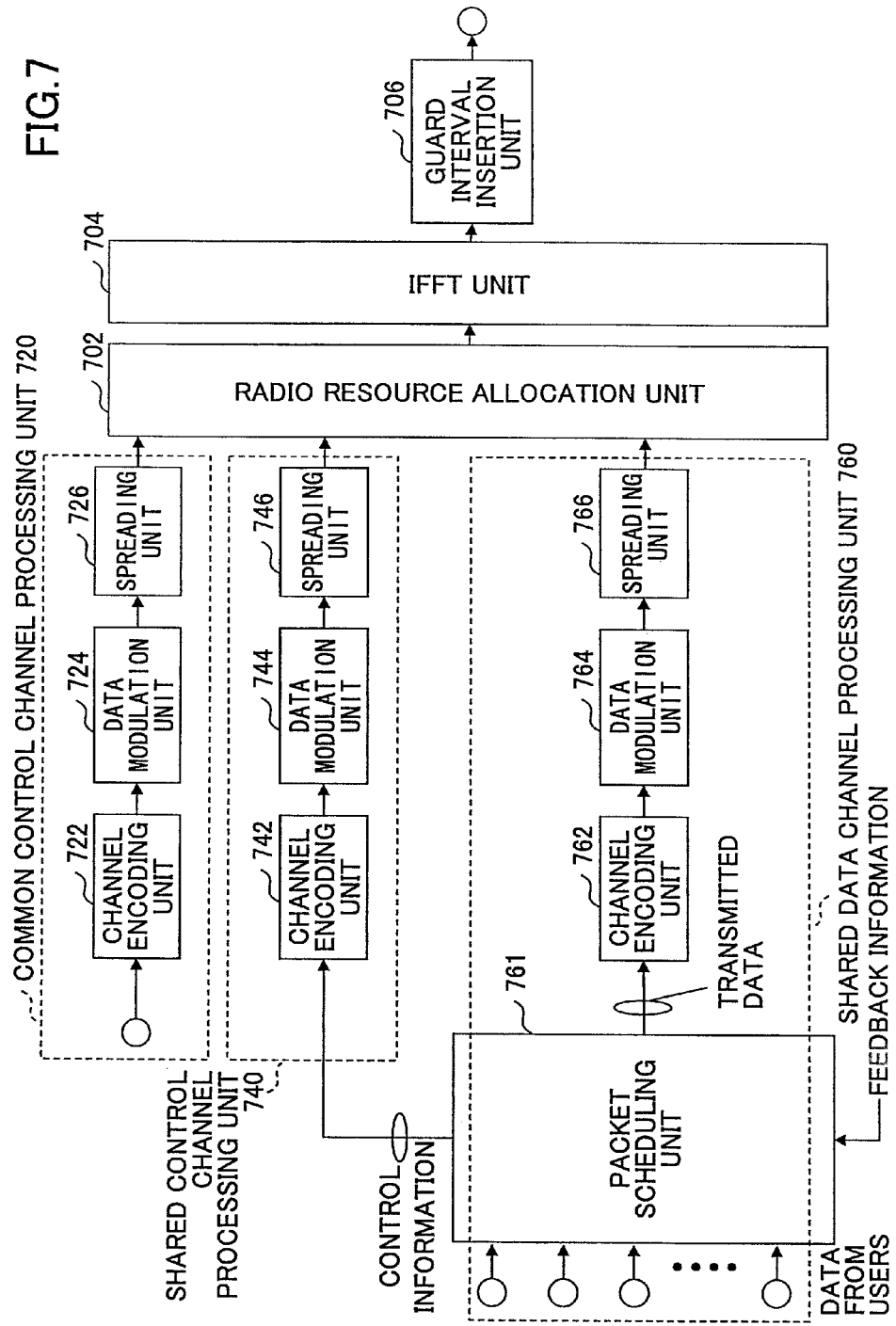
FIG. 7 is a block diagram of a transmitter according to one embodiment of the present invention.

FIG. 7 shows a transmitter 700 according to one embodiment of the present invention. The transmitter 700 is typically provided in a base station of a mobile communication system as described in this embodiment, but it may be provided in other apparatuses. If not stated specifically, it is assumed that a base station and a transmitter may be used equivalently hereinafter. In FIG. 7 illustrating a portion of the transmitter 700, a common control channel processing unit 720, a shared control channel processing unit 740, a shared data channel processing unit 760, a radio resource assignment unit 702, an inverse Fourier transform unit 704 and a guard interval processing unit 706 are illustrated.

The common control channel processing unit 720 conducts channel encoding, modulation and spreading for transmitting shared control channels. A shared control channel includes certain information such as a base station scramble code.

The shared control channel processing unit 740 conducts encoding, modulation and spreading for transmitting shared control channels. A shared control channel includes certain information such as scheduling information for a mobile station to demodulate a shared data channel.

The common control channel processing unit 720 includes a channel encoding unit 722, a data modulation unit 724 and a spreading unit 726. Also, the shared control channel processing unit 740 includes a channel encoding unit 742, a data modulation unit 744 and a spreading unit 746.

The channel encoding units 722 and 742 encode incoming signals in accordance with a certain coding algorithm and supply the encoded signals. In the channel encoding units, for example, convolution coding may be conducted.

The data modulation units 724 and 744 modulate incoming signals and supply the modulated signals. In the data modulation units, for example, some modulation schemes such as QPSK may be carried out.

The spreading units 726 and 746 spread incoming signals and supply the resulting signals.

The shared data channel processing unit 760 conducts packet scheduling as well as channel encoding, modulation and spreading on shared data channels (transmitted data). The shared data channel processing unit 760 includes a packet scheduling unit 761, a data modulation unit 764 and a spreading unit 766.

Figure 2:
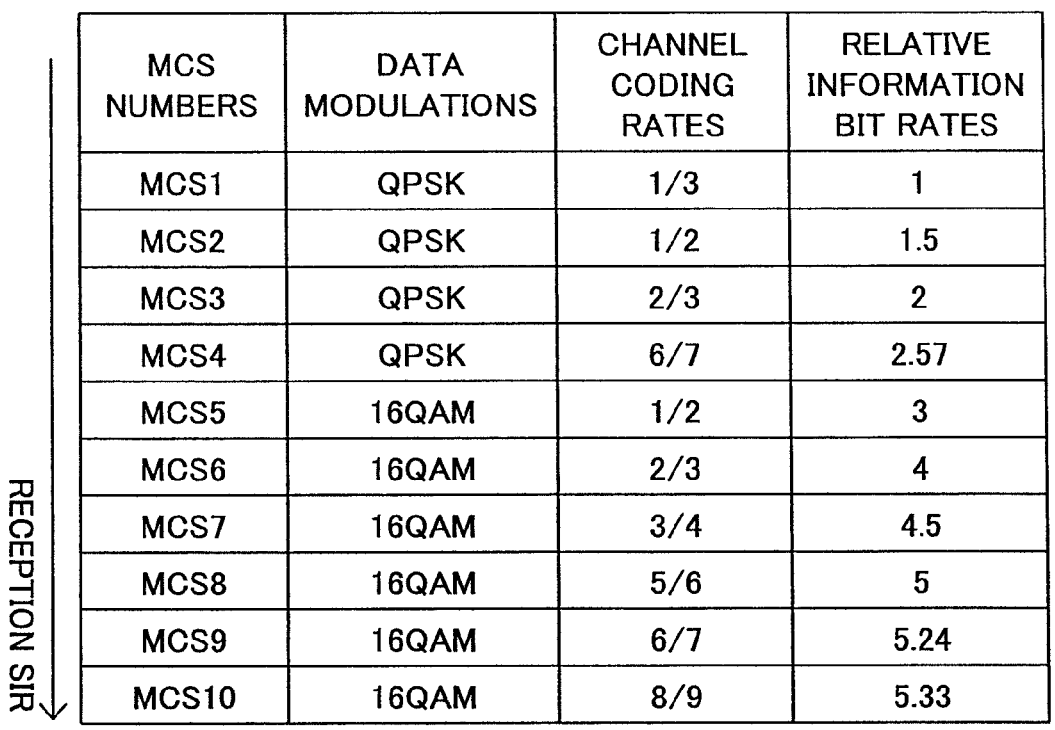
FIG. 2 is a diagram illustrating exemplary combinations between different modulation schemes and different channel coding rates.
Figure 3:
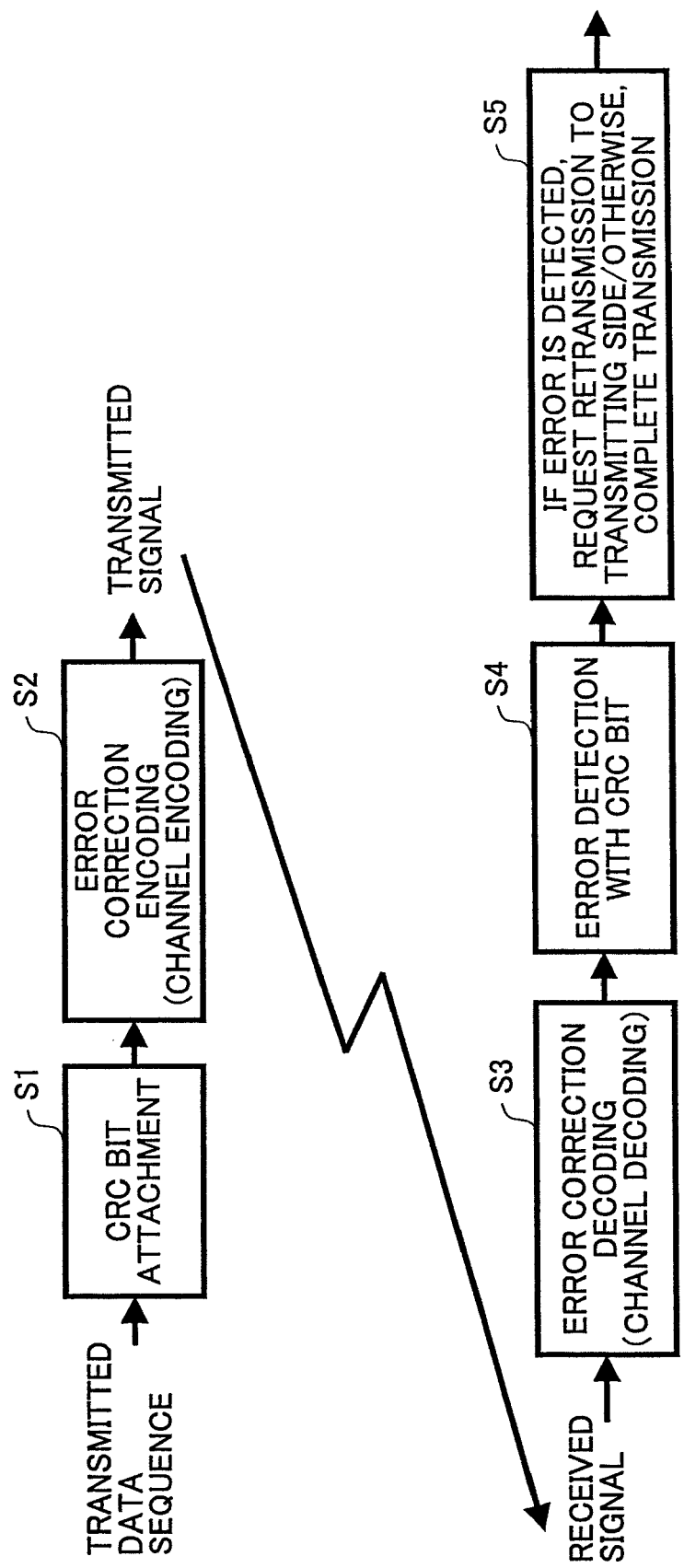
FIG. 3 is a schematic view for explaining the hybrid ARQ scheme.
Figure 4:
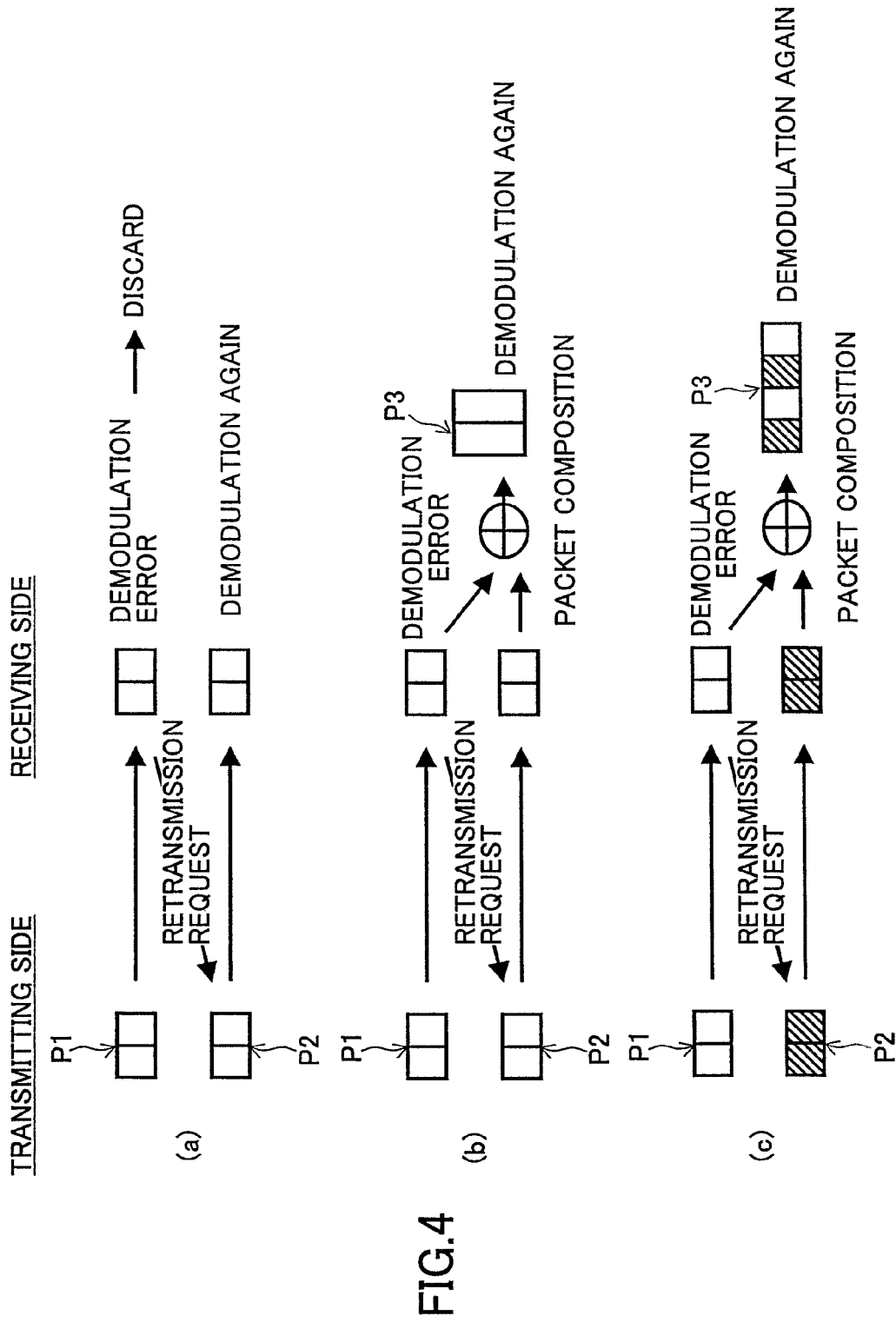
FIG. 4 is a diagram illustrating an exemplary transmission scheme.
Figure 5:
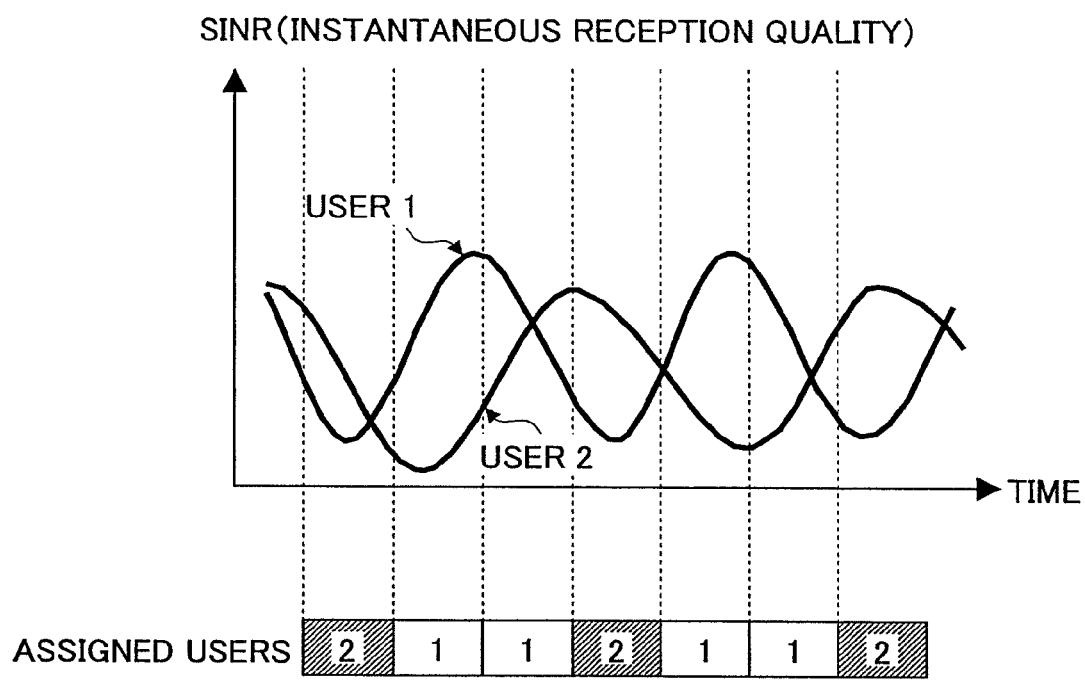
FIG. 5 is a diagram illustrating reception quality varying over time.
Figure 6:
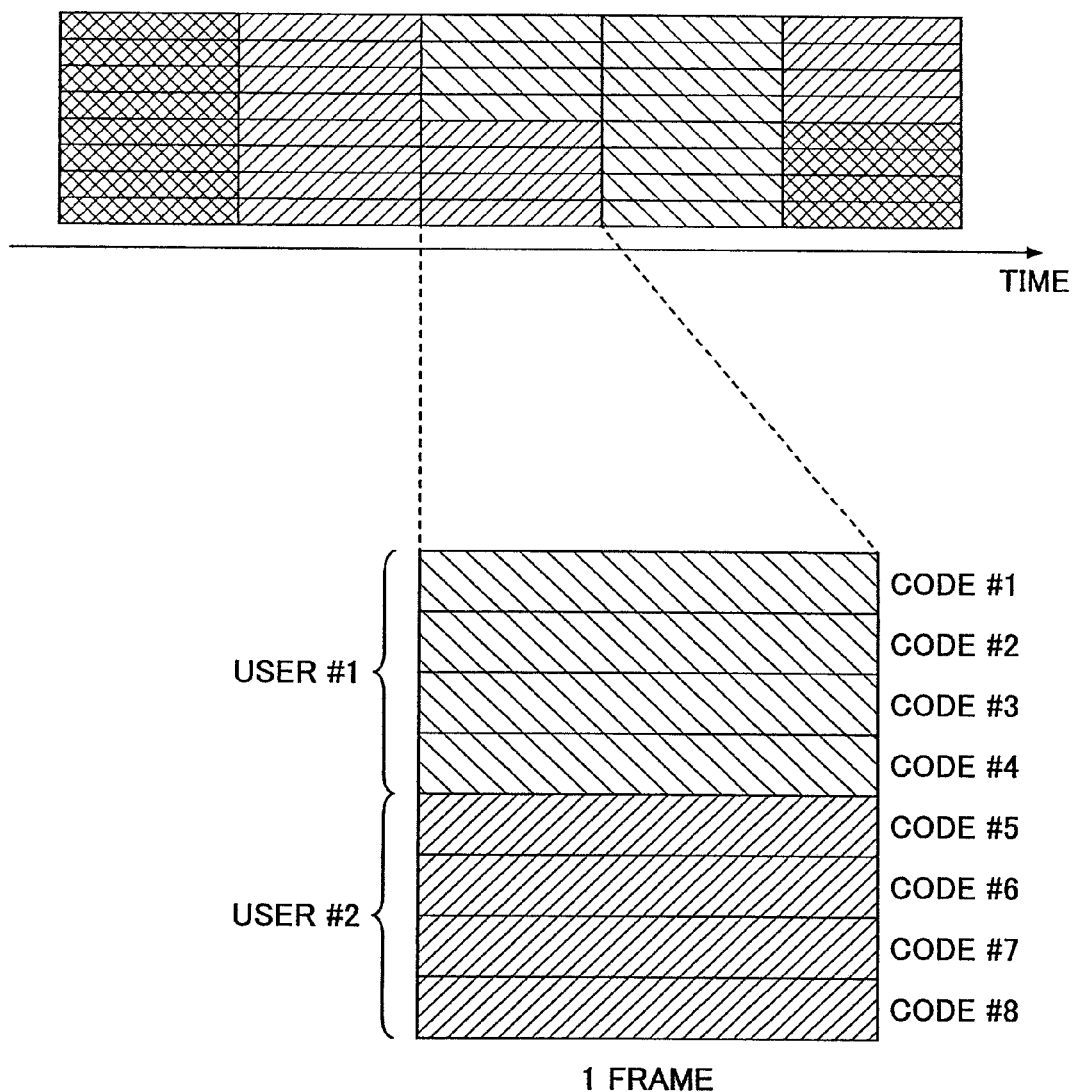
FIG. 6 is a diagram illustrating exemplary code multiplexing for plural users.

The packet scheduling unit 761 receives individual data items to be transmitted to one or more mobile stations, and schedules the data transmission based on feedback information and others supplied from the respective mobile stations. The data to be transmitted to the mobile stations are received from upper devices or networks other than a base station, and are separately stored in a transmission buffer (not shown) for the respective mobile stations. The feedback information includes a channel quality indicator (CQI) measured in each mobile station, and the CQI is represented as SIR in this embodiment. The packet scheduling unit 761 evaluates the channel condition for each mobile station based on the channel quality indicator CQI reported from the mobile station, and selects a mobile station(s) with a better channel condition. As stated below, the channel quality indicators CQIs supplied from mobile stations are reported for each frequency block (or chunk). The packet scheduling unit 761 determines a combination (MCS number) of a modulation scheme and a channel coding rate corresponding to downlink data transmission based on the channel quality indicators CQIs supplied from the respective mobile stations. The MCS number may be determined in accordance with a table as illustrated in FIG. 2. Also, the packet scheduling unit 761 conducts operations associated with packet retransmission based on the feedback information. Information items such as selected mobile stations, the MCS number and retransmission control information are supplied as control information to the shared control channel processing unit 740. Data to be transmitted to the selected mobile stations are supplied as transmitted data to the channel encoding unit 762.

The channel encoding unit 762 encodes incoming signals in accordance with a certain coding algorithm, and supplies the encoded signals. In the channel encoding unit, for example, turbo encoding may be carried out.

The data modulation unit 764 modulates incoming signals and supplies the modulated signals. In the data modulation unit, for example, various types of modulation schemes such as QPSK, 16 QAM and 64 QAM may be used.

The spreading unit 766 spreads incoming signals and supplies the spread signals.

Figure 8:
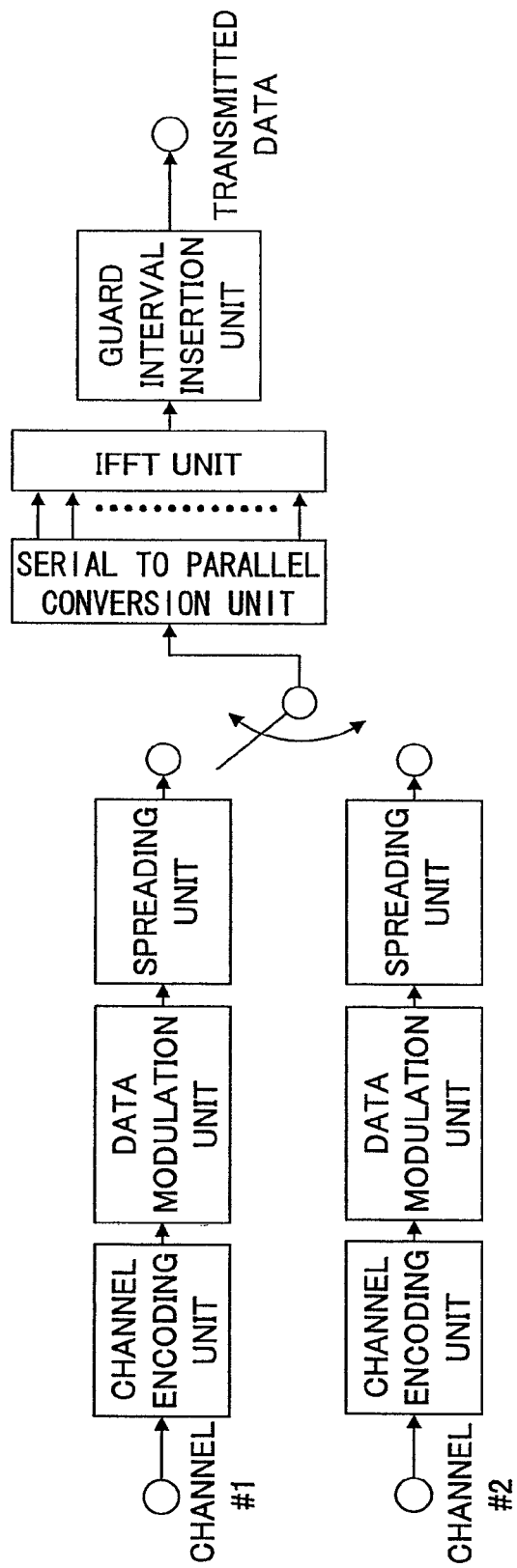
FIG. 8 is a diagram illustrating exemplary time multiplexing in a radio resource assignment unit.
Figure 9:
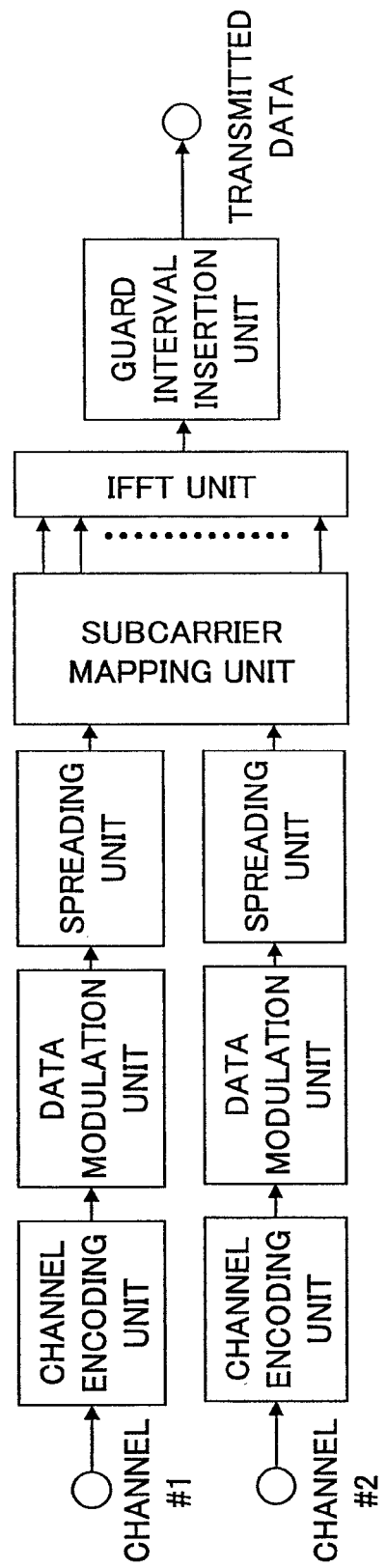
FIG. 9 is a diagram illustrating exemplary frequency multiplexing in the radio resource assignment unit.
Figure 10:
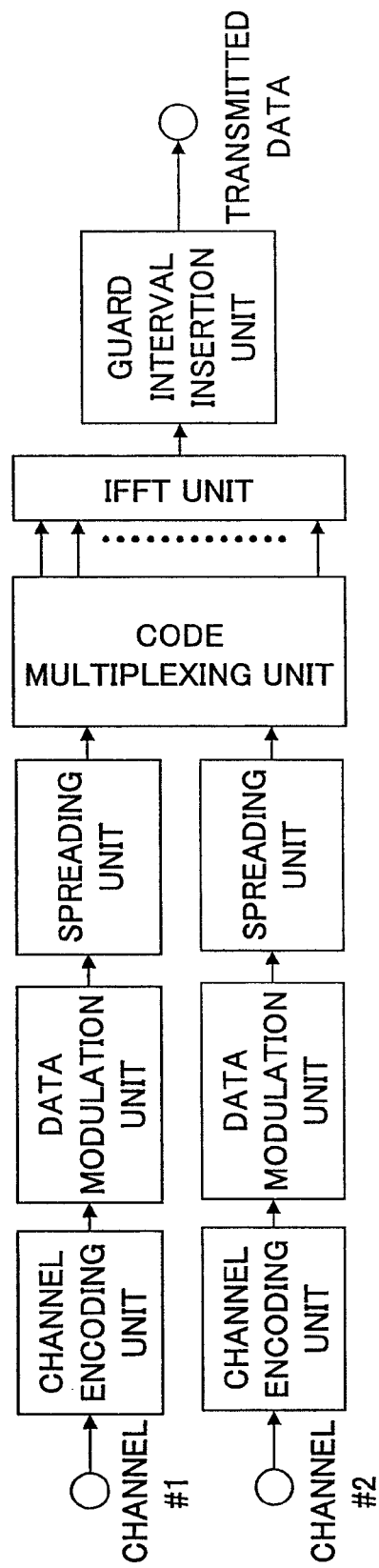
FIG. 10 is a diagram illustrating exemplary code multiplexing in the radio resource assignment unit.

The radio resource assignment unit 702 multiplexes signals spread for a common control channel, a shared control channel and a shared data channel for output. This multiplexing may be carried out in accordance with any of time multiplexing, frequency multiplexing and code multiplexing and any combination thereof. FIG. 8 shows exemplary time multiplexing of two signals. In this illustration, "channel #1" and "channel #2" represent any two of a common control channel, a shared control channel and a shared data channel. Although multiplexing of two signals is illustrated therein for simplicity, three signals may be time multiplexed. FIG. 9 shows exemplary frequency multiplexing of two signals, and FIG. 10 shows exemplary code multiplexing of two signals. An appropriate radio resource (a time slot, a frequency band and/or a code) may be assigned to a common control channel, a shared control channel and a shared data channel through some multiplexing in the radio resource assignment unit 702 of FIG. 7.

The inverse Fourier transform unit 704 conducts inverse fast Fourier transform (IFFT) on incoming signals for modulation in accordance with the OFDM scheme, and supplies the modulated signals.

The guard interval processing unit 706 adds a guard interval to an incoming signal, and generates a symbol in compliance with the OFDM scheme (OFDM symbol) for output. The OFDM symbol is supplied to a radio unit (not shown) for radio transmission.

Figure 11:
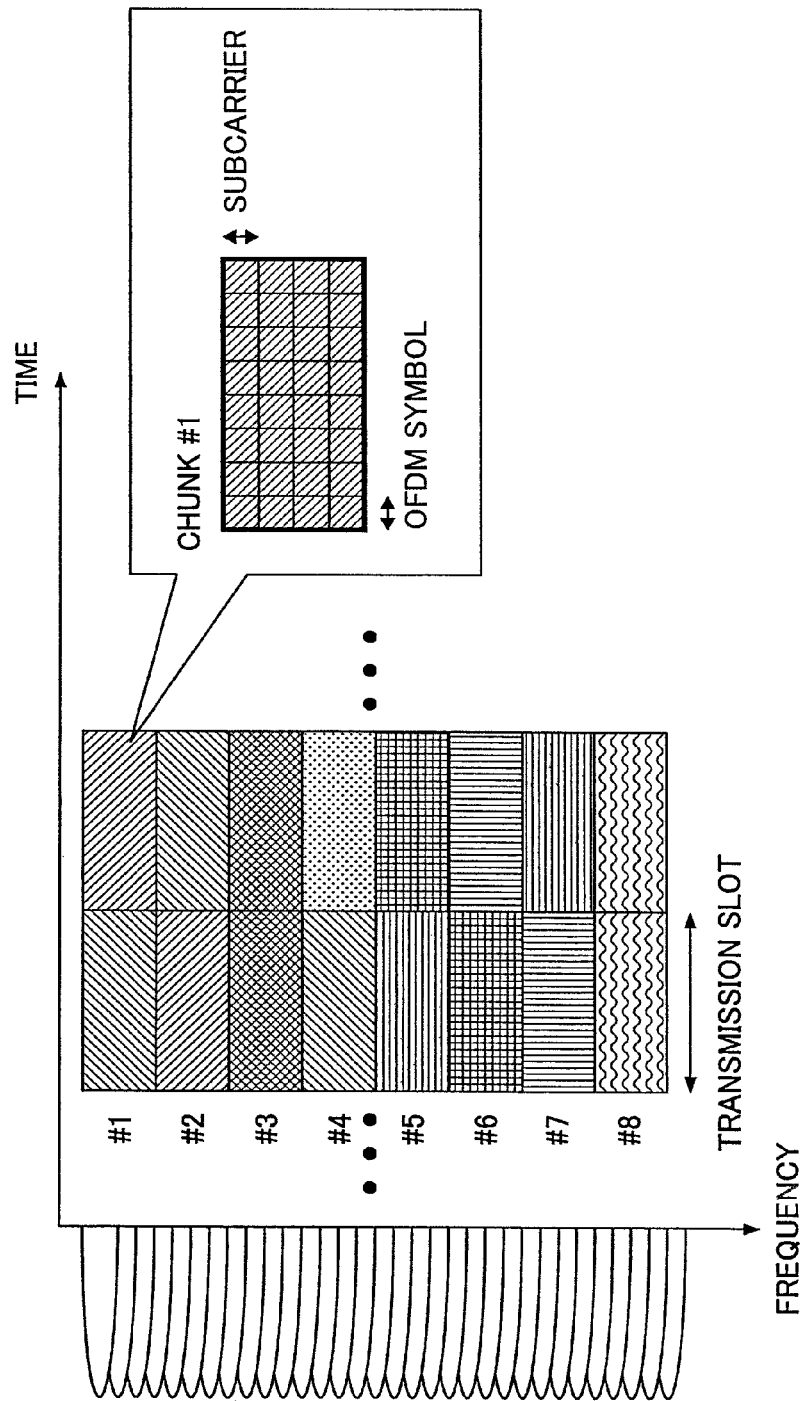
FIG. 11 is a diagram illustrating exemplary radio resource assignment with use of plural frequency blocks.

FIG. 11 is a schematic diagram for explaining an exemplary operation of a transmitter according to one embodiment of the present invention. As stated above, a wide downlink frequency band is divided into plural frequency blocks or chunks. In this embodiment, each frequency block includes plural subcarriers. In this embodiment, radio resources are assigned not only for each time slot (referred to as "transmission slot" in the illustration) but also for each frequency block. As stated below, such a time slot may consist of one transmission time interval (TTI) or any packet time duration. In the illustrated example, the overall downlink frequency band is divided into eight frequency blocks where each of the frequency blocks includes the same number of subcarriers. For each of the eight frequency blocks, the channel condition is monitored, and the frequency block is assigned for a mobile station with a better channel condition.

Figure 12A:
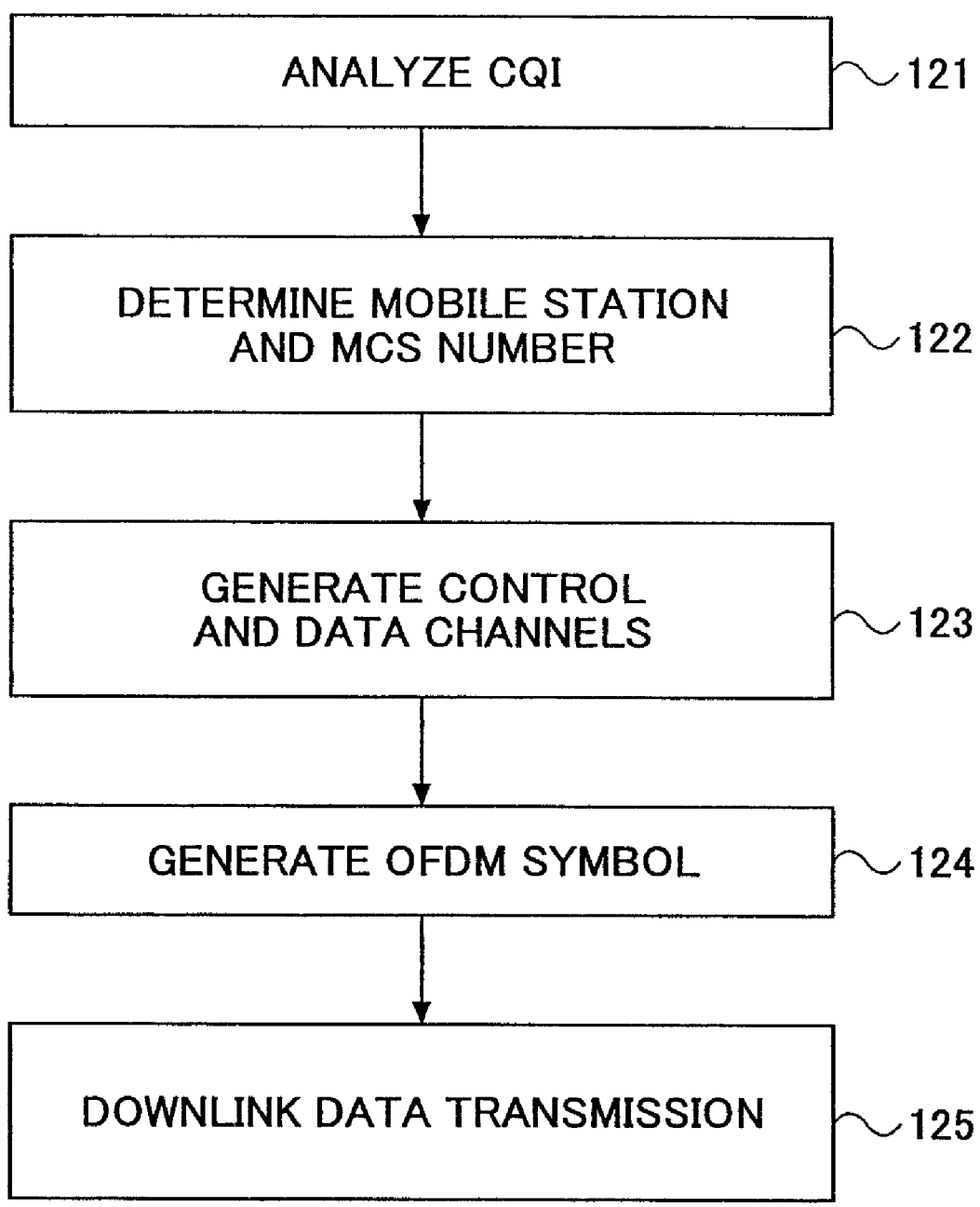
FIG. 12A is a diagram illustrating a transmission procedure in a base station according to one embodiment of the present invention.

FIG. 12A is a flowchart illustrating an exemplary transmission procedure in a base station. At step S121, the base station receives channel quality indicators CQIs from one or more mobile stations, and analyzes the received channel quality indicators CQIs. The channel quality indicators CQIs such as reception SIRs are reported for each frequency block. In this case, prior to starting this flow, the mobile stations measure quality of a received signal such as a pilot signal, and evaluate the downlink channel condition for each frequency block.

At step 122, it is determined which mobile station has a better channel condition for each frequency block based on the reception SIR reported for the frequency block, and a mobile station with the best reception SIR in the reported reception SIRs is selected for the frequency block. In addition, a combination (MCS number) of a modulation scheme and a channel coding rate corresponding to the reception SIR is determined. This determination of the combination may be made for each frequency block. These steps S121 and S122 are mainly carried out in the packet scheduling unit 761 of FIG. 7. Although the modulation scheme may be determined for each frequency block as stated below, a uniform channel coding rate may be used for plural frequency blocks.

At step S123 of FIG. 12A, a common control channel, a shared control channel and a shared data channel are generated. These generations are carried out in the respective processing units 720, 740 and 760 in FIG. 7. Note that the respective channels do not have to be generated simultaneously in this step. The shared control channel is generated based on control information supplied from the packet scheduling unit 761 in FIG. 7. This control information includes some information (MCS number etc.) required to demodulate the shared data channel. Specifications of the control information and transmission methods thereof will be described below.

At step S124 in FIG. 12A, an OFDM symbol is generated. This generation is mainly carried out in the radio resource assignment unit 702, the IFFT unit 704 and the guard interval insertion unit 706.

At step S125 in FIG. 12A, for the selected mobile station at step S122, downlink data transmission is carried out in one or more frequency blocks in accordance with the determined MCS number.

FIG. 12B is a flowchart for explaining exemplary detailed operations of the steps S123 and S124 in FIG. 12A. At step S1, an error detection bit is added to a sequence of transmitted data. Although a cyclic redundancy check (CRC) bit is added in the illustration, other correction detection bits may be added.

At step S2, channel encoding is performed. As stated above, the channel encoding is carried out in the channel encoding units 722, 742 and 762 in FIG. 7, and particularly, the channel encoding for data channels is carried out in the channel encoding unit 762.

At step S3, some operation involved in hybrid ARQ is performed. More specifically, an information item is generated for indicating whether a transmitted packet is either a packet to be retransmitted or a new packet, and additionally, other information items may be generated for identifying the redundancy version of a retransmitted packet. This redundancy version can be modified through puncturing or repetition. Also, the channel coding rate may be modified at this step.

At step S4, in assignment to a physical channel, the encoded symbol is assigned for each frequency block. This assignment is mainly carried out in the radio resource assignment unit 702 in FIG. 7. By frequency scheduling, it is determined for what frequency block the symbol of which user should be assigned.

At steps S5-1 to S5-N (N represents the total number of frequency blocks), in order to generate a transmission symbol, data modulation is performed for each frequency block. Subsequently, some operation (not shown) is carried out for radio transmission of the transmission symbol.

In the illustration of FIG. 12B, one modulation scheme is determined for each frequency block, and different transmission rates suitable for the respective frequency blocks may be set. Thus, the illustrated operation is preferred from the viewpoint of improved transmission throughput.

In the illustration in FIG. 12C, the steps S1 to S4 are the same as those in FIG. 12B except that step S5' is uniformly carried out over some frequency blocks. At step S5', a uniform modulation scheme is determined for all frequency blocks. More generally, such a uniform modulation scheme may be determined for plural frequency blocks. In the case where such a uniform modulation scheme is used for plural frequency blocks, it is possible to reduce the number of control bits (information amount) required to report the modulation scheme to the receiver side compared to the case of FIG. 12B.

Figure 12D:
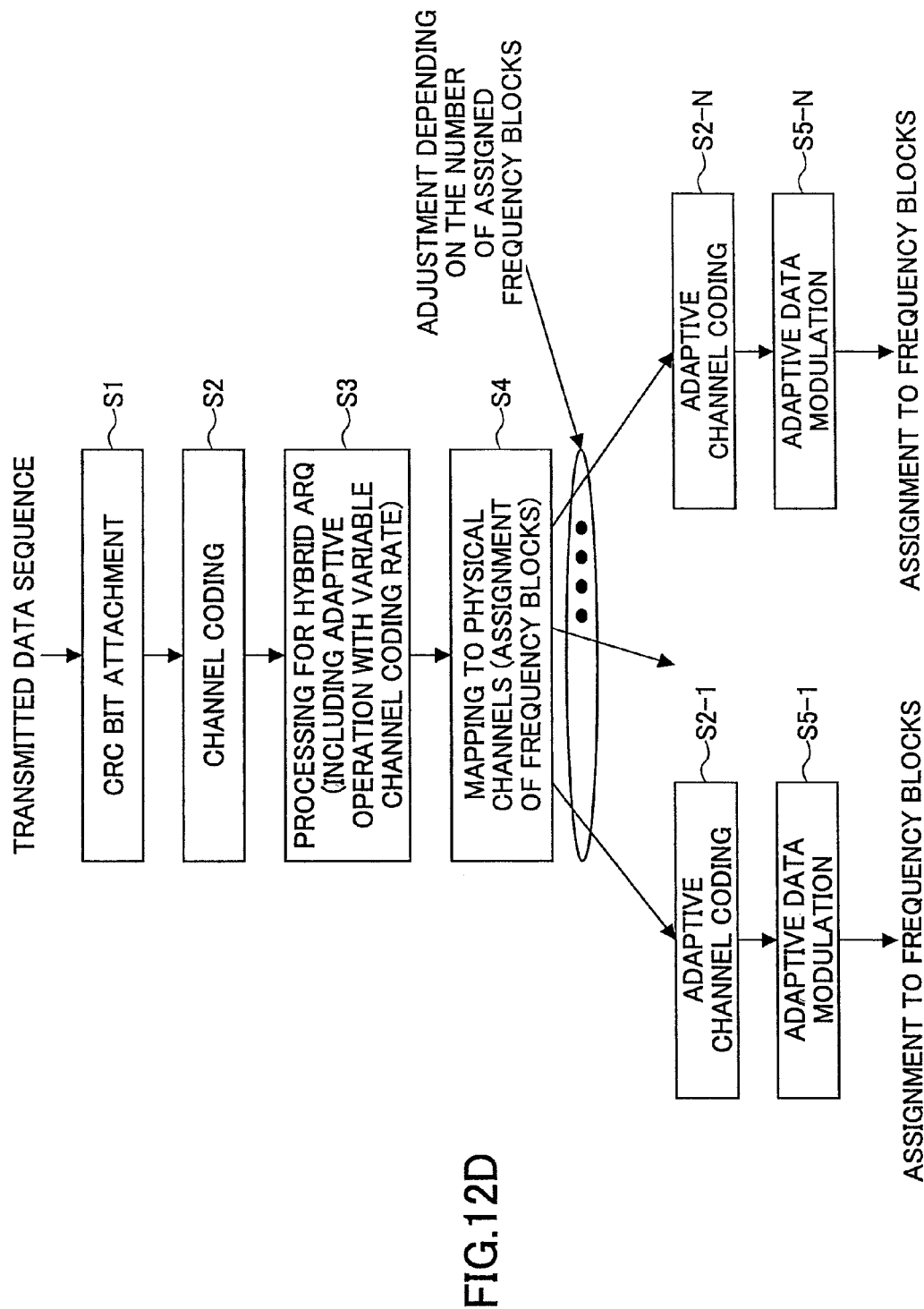
FIG. 12D is a flowchart (3) for explaining the transmission procedure in detail.

As illustrated in FIG. 12D, not only the modulation scheme but also the channel coding rate may be determined for each frequency block. Note that signal transmission may preferably be carried out in accordance with any of the schemes illustrated in FIGS. 12B and 12C in order to simplify the associated operation and encode data for different frequency blocks with the same accuracy.

In the illustration in FIG. 11, user #1 is selected for a certain transmission slot of frequency block #1 including the lowest subcarrier, and user #2 is selected for the next transmission slot. This means that user #1 has the best channel condition in the first transmission slot of the frequency block and user #2 has the best channel condition in the next transmission slot. By determining a mobile station with the best channel condition for each transmission slot in each frequency block and performing data transmission adaptively in accordance with a modulation suitable for the mobile station, efficient utilization of a wide frequency band is achieved.

FIG. 13 shows primary items of control information supplied to the shared control channel processing unit 740 by the packet scheduling unit 761 in FIG. 7 in detail. As illustrated in the leftmost column "FIELD NAMES" in the illustration, the control information includes chunk allocation information, modulation scheme information, coding rate information, hybrid ARQ process information, redundancy version, packet status information and UE identity.

The chunk allocation information specifies what frequency block is assigned for which mobile station (user). The number of frequency blocks assigned for a certain mobile station (user) maybe determined depending on a requested data rate, and may be greater than or equal to 1 in general. In the illustration in FIG. 11, user #1 is assigned to two frequency blocks #1 and #4 in the first transmission slot, and each of user #2 to user #6 and user #8 is assigned to one frequency block. In the subsequent transmission slot, each user is assigned to one frequency block. Such assignment to frequency blocks is described in the chunk allocation information. This information belongs to control information for the physical layer. Since it is described in this information how to allocate plural frequency blocks, the information does not have to be reported to the individual mobile stations for each frequency block.

The modulation scheme information specifies modulation schemes for use in downlink data transmission, and is identified by the MCS number. Here, various types of multilevel modulation schemes such as QPSK, 16 QAM, 64 QAM and 128 QAM may be employed. This information belongs to control information for the physical layer. The information is preferably reported to mobile stations for each frequency block, but may be reported for plural frequency blocks.

The coding rate information specifies channel coding rates for use in downlink data transmission, and may be identified by the MCS number. For example, the channel coding rate may be specified by a multiple such as $\frac{1}{8}=0.125$. This information belongs to control information for the layer 2 above the physical layer. The channel coding rate may be managed for each modulation scheme as well as for each frequency block, and may be reported to mobile stations for each frequency block. On the other hand, the channel coding rate maybe managed apart from the modulation scheme, and a uniform channel coding rate may be employed over plural frequency blocks. In FIG. 13, "REQUIRED" of the rightmost column corresponds to the former case, whereas "NOT REQUIRED" corresponds to the latter case.

The hybrid ARQ process information specifies a packet number associated with retransmission control. This information belongs to control information for the layer 2. A packet may be retransmitted for each frequency block in accordance with the hybrid ARQ. Alternatively, a packet may be retransmitted for each transmission slot without distinguishing between different frequency blocks. In FIG. 13, "REQUIRED" of the rightmost column corresponds to the former case, whereas "NOT REQUIRED" corresponds to the latter case.

The redundancy version specifies what puncture pattern is used in retransmission control. This information belongs to control information for the layer 2. Similar to the hybrid ARQ process information, redundancy data may be transmitted for each frequency block. Alternatively, the redundancy data may be transmitted for each transmission slot without distinguishing between different frequency blocks. In FIG. 13, "REQUIRED" of the rightmost column corresponds to the former case, whereas "NOT REQUIRED" corresponds to the latter case.

The packet status information specifies whether a packet transmitted from a base station to a mobile station is a newly transmitted packet (new packet) or a retransmitted packet. This information belongs to control information for the layer 2. A packet may be retransmitted for each frequency block in accordance with the hybrid ARQ. Alternatively, it may be retransmitted for each transmission slot without distinguishing between different frequency blocks. In FIG. 13, "REQUIRED" of the rightmost column corresponds to the former case, whereas "NOT REQUIRED" corresponds to the latter case.

The UE identity identifies which mobile station or user receives data transmitted in the downlink, and is also called a user identifier or identification information. This information belongs to control information for the physical layer. Similar to the chunk allocation information, the UE identity does not have to be reported mobile stations for each frequency block.

FIG. 14 shows exemplary mapping of a control channel and the other channels in downlink physical channels. In configuration 1, the control channel is mapped or multiplexed in a certain frequency range over the entire time duration. The frequency range may or may not be the same as the frequency block range. In configuration 2, the control channel is mapped in the overall frequency range in a certain time duration. In configuration 3, the mappings of configurations 1 and 2 are combined. In the configuration 3, the control channel is mapped to certain frequency ranges over a certain time duration. In general, as the control channel is more widely mapped in the frequency direction, frequency diversity has more advantage, which is desirable from the viewpoint of improvement of reception quality of signals.

Figure 15A:
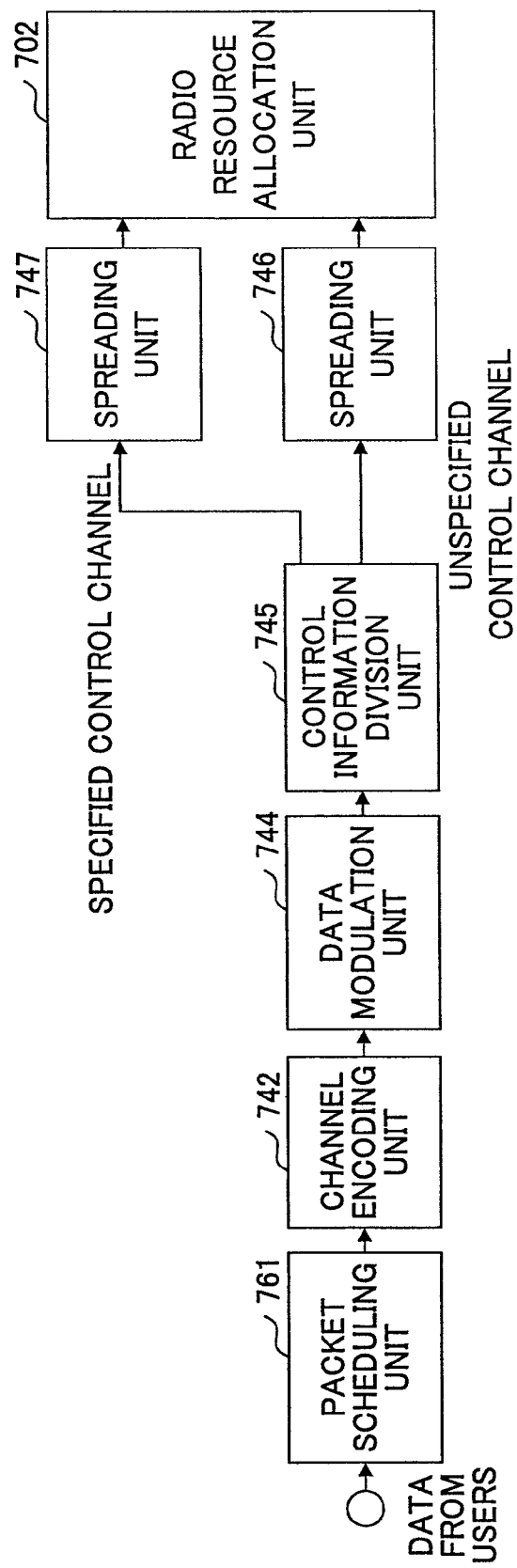
FIG. 15A is a diagram illustrating an embodiment where control information is mapped per frequency block in a downlink physical channel.

In configuration 4, the control channel is mapped to every frequency block in the downlink physical channel. The control channel may have a variable data size depending on the number of users or the number of frequency blocks. So, if all channels are mapped in accordance with the configuration 2, the control channel occupies variable duration, which may complicate demodulation. By combining the configuration 2 with the configuration 4, for example, control channels associated with all frequency blocks (unspecified control channels) are mapped to the entire frequency range as in the configuration 2, and thereby a control channel specific to a certain frequency block (specified control channel) only can be mapped to the frequency block. As a result, the efficiency and quality of demodulation of the control channels is improved. In order to map a control channel for each frequency block, as illustrated in FIG. 15A, it is desirable to provide a control information division unit 745 for separating the control channel associated with a certain frequency block from the other control channels.

Figure 15B:
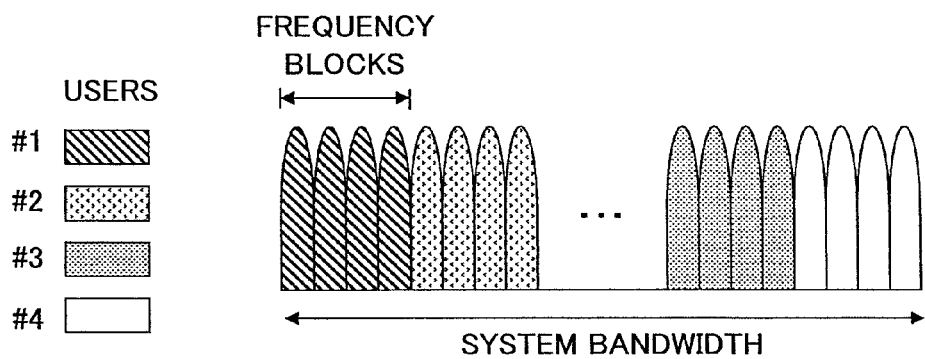
FIG. 15B is a diagram illustrating an exemplary localized FDM.

The mapping configurations as illustrated in FIG. 14 are simply illustrative, and the control channel and the other channels may be multiplexed in various schemes including single time multiplexing, frequency multiplexing or code multiplexing or any combination thereof. In addition, the multiplexing is not limited to the control channel and the other channels, and may be performed on any channels. For example, in case of multiplexing of data channels for individual users, various modulation schemes may be employed. As one example, each of plural users may be assigned to one or more frequency blocks, and the modulation scheme may be determined in such a manner as illustrated in FIG. 12B. In the example illustrated in FIG. 15B, each of four users may be assigned to a frequency block, and different modulation schemes may be set for each of the frequency blocks. Alternatively, a uniform modulation scheme may be determined over plural frequency blocks as illustrated in FIG. 12C. The multiplexing in the frequency direction as illustrated in FIG. 15B is referred to as a localized frequency division multiplexing (localized FDM) scheme due to a certain band being occupied by a certain user. On the other hand, a scheme for distributing a channel associated with a certain user over a wideband is referred to as a distributed FDM scheme. In the latter scheme, each channel includes plural frequency components (subcarrier components) assigned in a uniform or non-uniform interval on the frequency axis, and different channels are made orthogonal with each other in the frequency range. In the illustration in FIG. 15C, channels of individual users are distributed over the whole system band, and are made orthogonal with each other in the frequency range.

Figure 15C:
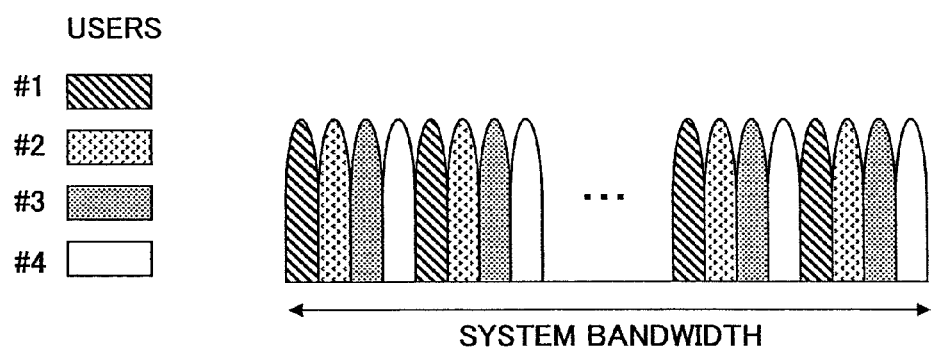
FIG. 15C is a diagram illustrating an exemplary distributed FDM.

At least one of a modulation scheme and a channel coding rate may be determined for each frequency block or may be determined for plural frequency blocks uniformly. Also, they may be determined in further smaller frequency units. Thus, according to the multiplexing as illustrated in FIG. 15C, a modulation scheme may be determined for each subcarrier. Even if the modulation scheme is determined in such a smaller unit, however, it is estimated that the throughput cannot be so much improved. Also, since additional control channels for identifying all of them are required, there is a risk of increasing the processing workload and the amount of control information. On the other hand, according to the distributed FDM, the frequency diversity has more advantage, and thus improved signal quality can be expected. Therefore, in the case of the distributed FDM, it is desirable that the modulation scheme and the channel coding rate be uniformly determined over all subcarriers, resulting in a reduced amount of control information.

Figure 16:
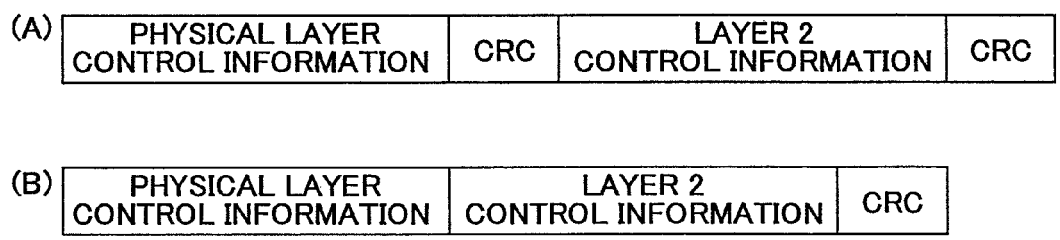
FIG. 16 is a diagram illustrating an embodiment where error detection coding is performed on control information.

FIG. 16 shows exemplary error detection encoding on a control channel. The error detection encoding may be carried out, for example, with the use of cyclic redundancy check CRC code. The error detection encoding makes it possible to prevent a user from demodulating data for another user and performing erroneous retransmission control, for example. In the illustration in FIG. 16A, control information for physical layer and control information for the upper layer 2 are separately error detection encoded. It is advantageous in terms of mapping per frequency block like the configuration 4 in FIG. 14 to conduct error detection encoding depending on the type of the control information. In the illustration in FIG. 16B, control information for the physical layer and the control information for the upper layer 2 may be error detection encoded together. Compared to the case where the error detection encodings are separately carried out, this scheme is advantageous due to reduced overhead. Preferably, they are error detection encoded separately to improve error detection capability and fulfill a smaller retransmission unit as illustrated in FIG. 16A.

Figure 17:
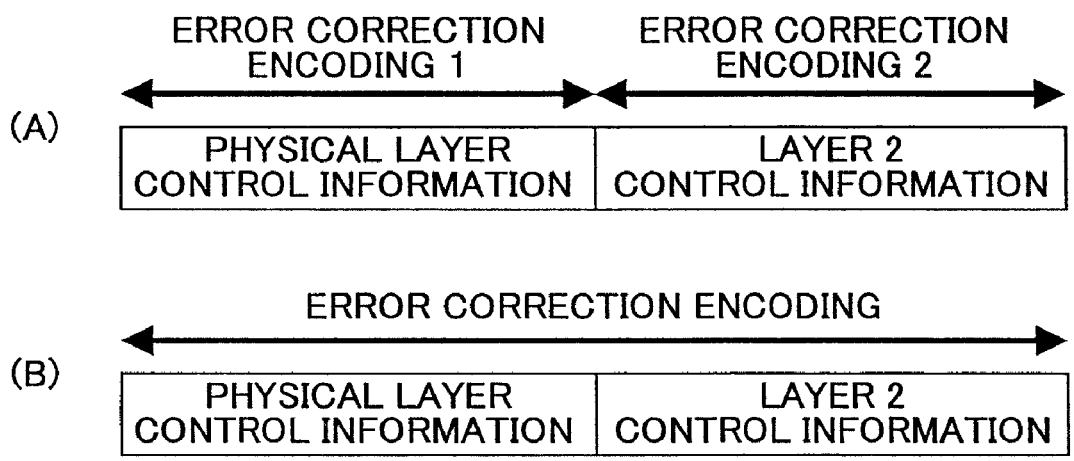
FIG. 17 is a diagram illustrating an embodiment where error correction coding is performed in control information.

FIG. 17 shows exemplary error correction encoding on control information. The error correction encoding may be carried, for example, by use of convolution encoding. The error correction encoding may improve tolerance over multipath fading, for example. In the illustration in FIG. 17A, the control information for the physical layer and the control information for the upper layer 2 are error correction encoded separately. In the illustration in FIG. 17B, the control information for the physical layer and the control information for the upper layer 2 are error correction encoded together. In other words, error correction encoding is performed on the overall control information. This is desirable from the viewpoint of reduced overhead. In addition, the error correction capability (encoding gain) is advantageous to the case (B) of a longer coding unit. However, such a longer coding unit may cause chaining of a bit error to subsequent bits. In other words, the longer coding unit may tend to increase the error occurrence probability. In fact, the coding unit maybe determined by balancing these characteristics.

FIG. 18 shows an exemplary table for listing various methods where one or more of frequency range based packet scheduling, adaptive modulation coding (AMC) and hybrid ARQ are carried out for each frequency block. In one row, some features of one method are illustrated.

In the method 1, all of the frequency range based packet scheduling, data modulation, the channel coding rate and hybrid ARQ are controlled for each frequency block. In this manner, frequency resources can be utilized most efficiently, resulting in extremely efficient data transmission. However, many of the control information items listed in FIG. 13 have to be managed for each frequency block, resulting in considerably increasing the overhead. More specifically, all of modulation scheme information, coding rate information, hybrid ARQ process information, redundancy version and packet status information are reported to mobile stations for each frequency block.

In the column "CHARACTERISTICS" in the table, the symbol double circle "⊚" indicates that the data transmission is extremely efficient. The symbol circle "○" indicates that the data transmission is very efficient. The symbol triangle "Δ" indicates that the data transmission is moderately efficient. The symbol cross "×" indicates that the data transmission is inefficient. Also in the column "OVERHEAD" in the table, the symbol double circle "⊚" indicates that the overhead is very low. The symbol circle "○" indicates that the overhead is low. The symbol triangle "Δ" indicates that the overhead is high. The symbol cross "×" indicates that the overhead is very high. Note that the symbols used herein simply indicate tendency of relative merits and the availability is not necessarily determined.

In the method 2, the frequency range based packet scheduling, the data modulation and the hybrid ARQ are controlled for each frequency block, whereas the channel coding rate is controlled for each transmission time interval TTI. The transmission time interval is a constant unit time specific to a system. In the method 2, only the channel coding rate is set to have a uniform value over all frequency blocks. Thus, the method 2 achieves reduction in overhead compared to the method 1 in that the channel coding rate does not have to be managed for each frequency block. More specifically, the modulation scheme information, the hybrid ARQ process information, the redundancy version and the packet status information are reported to mobile stations for each frequency block, whereas a uniform coding rate information over all frequency blocks is reported.

In the method 3, the frequency range based packet scheduling, the data modulation and the hybrid ARQ are controlled for each frequency block, whereas the channel coding rate is controlled for each packet. The length (duration) of a packet may be a relative amount defined in an upper network, for example, it may or may not be the same as absolute unit time (TTI) specific to a system. In the method 3, only the channel coding rate is set to have a uniform value over all frequency blocks. Thus, the method 3 can also reduce the overhead compared to the method 1 in that the channel coding rate does not have to be managed for each frequency block. More specifically, the modulation scheme information, the hybrid ARQ process information, the redundancy version and the packet status information are reported to mobile stations for each frequency block, whereas uniform coding rate information over all frequency blocks is reported. Note that the coding rate information has to be reported for each packet.

In the method 4, the frequency range based packet scheduling, the data modulation and the channel encoding are controlled for each frequency block, whereas the hybrid ARQ is controlled for each packet. In other words, retransmission is controlled without distinguishing between different frequency blocks, resulting in reduced overhead accordingly. Also, the length of a packet is equal to one unit of actually communicated information, and retransmission is carried out for each packet. This is preferable from the viewpoint of improvement of the throughput. More specifically, the modulation scheme information and the coding rate information are reported to mobile stations for each frequency block, whereas the hybrid ARQ process information, the redundancy version and the packet status information are reported uniformly over all frequency blocks. Note that information associated with retransmission control has to be reported for each packet.

In the method 5, the frequency range based packet scheduling and the data modulation are controlled for each frequency block, the channel coding is controlled for each transmission time interval, and the hybrid ARQ is controlled for each packet. In other words, the channel coding rate and retransmission are controlled without distinguishing between different frequency blocks, resulting in reduced overhead accordingly. More specifically, the modulation scheme information is reported to mobile stations for each frequency block, whereas the coding rate information, the hybrid ARQ process information, the redundancy version and the packet status information are reported uniformly over all frequency blocks. Note that information associated with retransmission control has to be reported for each packet.

In the method 6, the frequency range based packet scheduling and the data modulation are controlled for each frequency block, whereas the channel coding rate and the hybrid ARQ are controlled for each packet. In other words, the channel coding rate and retransmission are controlled without distinguishing between different frequency blocks, resulting in reduced overhead accordingly. More specifically, the modulation scheme information is reported to mobile stations for each frequency block, whereas the coding rate information, the hybrid ARQ process information, the redundancy version and the packet status information are reported uniformly over all frequency blocks. Note that some information associated with the coding rate and the retransmission control has to be reported for each packet.

In the method 7, the frequency range based packet scheduling, the data modulation and the channel coding are controlled for each frequency block, whereas the hybrid ARQ is controlled for each transmission time interval TTI. In other words, only the retransmission is controlled without distinguishing between different frequency blocks. The method 7 can reduce overhead in that the retransmission does not have to be controlled for each frequency block. Also, since the retransmission is carried out for each transmission time interval TTI regardless of the packet length, the retransmission control can be simplified. More specifically, the modulation scheme information and the coding rate information are reported to mobile stations for each frequency block, whereas the hybrid ARQ process information, the redundancy version and the packet status information are reported uniformly over all frequency blocks. Note that some information associated with the retransmission control has to be reported for each transmission time interval TTI.

In the method 8, the frequency range based packet scheduling and the data modulation are controlled for each frequency block, whereas the channel coding and the hybrid ARQ are controlled for each transmission time interval. In other words, the channel coding rate and the retransmission are controlled without distinguishing between different frequency blocks, resulting in reduced overhead accordingly. More specifically, the modulation scheme information is reported to mobile stations for each frequency block, whereas the coding rate information, the hybrid ARQ process information, the redundancy version and the packet status information are reported uniformly over all frequency blocks. Note that some information associated with the coding rate information and the retransmission control has to be reported for each transmission time interval.

In the method 9, the frequency range based packet scheduling and the data modulation are controlled for each frequency block, the channel coding is controlled for each packet, and the hybrid ARQ is controlled for each transmission time interval. In other words, the channel coding rate and the retransmission control are controlled without distinguishing between different frequency blocks, resulting in reduced overhead accordingly. More specifically, the modulation scheme information is reported to mobile stations for each frequency block, whereas the coding rate information, the hybrid ARQ process information, the redundancy version and the packet status information are reported uniformly over all frequency blocks. Note that the coding rate information has to be reported for each packet and that some information associated with the retransmission control has to be reported for each transmission time interval.

In the method 10, the frequency range based packet scheduling is controlled for each frequency block, whereas the data modulation, the channel coding and the hybrid ARQ are controlled for each transmission time interval. In other words, the data modulation, the channel coding rate and the retransmission are controlled without distinguishing between different frequency blocks, resulting in extremely reduced overhead. More specifically, the modulation scheme information, the coding rate information, the hybrid ARQ process information, the redundancy version and the packet status information are reported uniformly over frequency blocks. Note that these information items have to be reported for each transmission time interval TTI.

In conjunction with the methods 1-10, while the control over modulation schemes (modulation multilevel) has a strong influence on data transmission efficiency, throughput or frequency utilization, a lesser amount of information is required to specify the modulation schemes compared to the retransmission control information or others. Thus, the data modulation should be controlled for each frequency block. By comparing these methods, on the other hand, we can recognize that the control over the channel coding rate has little influence over the data transmission efficiency and overhead (characteristics). Thus, it is advantageous to control the channel coding rate for each transmission time interval TTI from the viewpoint of simplified signal processing. The retransmitted unit of the retransmission control ARQ has influence on the overhead, and it will be understood that higher overhead leads to higher data transmission efficiency. On the other hand, it is desirable to use an actually communicated information unit as criteria (to control the channel coding rate for each packet) rather than the transmission time interval TTI from the viewpoint of retransmission efficiency. Note that the channel coding rate is desirably controlled for each transmission time interval TTI from the viewpoint of simplified retransmission control.

[Second Embodiment]

According to the first embodiment, attachment of CRC bits, the channel coding and the retransmission control are carried out for only a single data sequence. In the second embodiment, the attachment of CRC bits, the channel coding and the retransmission control are carried out for each of plural data sequences.

Figure 20:
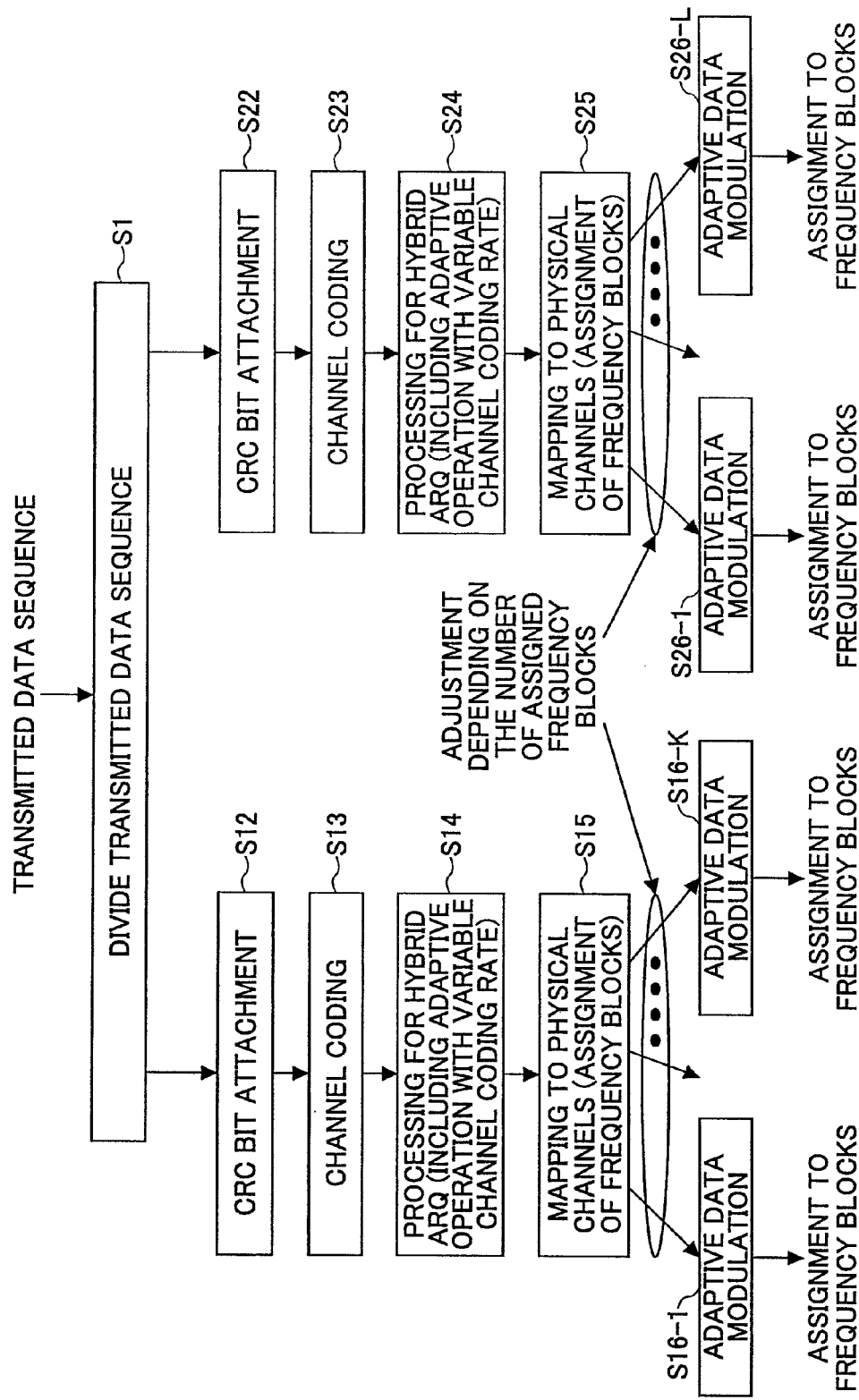
FIG. 20 is a flowchart (1) for explaining an exemplary transmission procedure.

FIG. 20 is a flowchart (1) illustrating an exemplary transmission procedure according to one embodiment of the present invention. At step S1, a sequence of transmitted data is divided into plural sequences. The operation on the divided sequences is performed as in the flowchart (1) in FIG. 12B. The division of the data sequence may be carried out, for example, in a serial to parallel (S/P) conversion unit. The division may be referred to as partition and segmentation. In any case, the size of divided data may be the minimum unit for retransmission. It is desirable that the size of divided data be made smaller from the viewpoint of retransmission of minimum required information. On the other hand, it is desirable that the size of divided data be made larger from the viewpoint of reduction in overhead associated with the retransmission. However, if the size of divided data is too large in the latter case, a large amount of data may have to be retransmitted due to occurrence of a slight error. Thus, it is desirable that if the data size exceeds a certain upper bound (predefined threshold) in the latter case, the division can be triggered. Although it is illustrated in FIG. 20 that the transmitted data sequence is divided into two sequences for simplicity, the transmitted data sequence may be divided into more than two sequences. Also, in the case where the division is triggered by the data size exceeding a threshold, the two lines of flow in FIG. 20 may not be necessarily conducted simultaneously. (If the data size is small, only one of the left-hand flow and the right-hand flow may be conducted.)

At steps S12 and S22, an error detection bit is attached to each of the divided transmitted data sequences. The data size of the divided sequences may or may not be uniform over the sequences.

At steps S13 and S23, each of the divided transmission data sequences is channel encoded. The channel coding rate R1 for step S13 and the channel coding rate for step S23 maybe determined independently. Also, they may be set to be different values or the same value.

At steps S14 and S24, an operation associated with hybrid ARQ is performed on each of the divided transmitted data sequences. More specifically, some information is generated for indicating whether a packet to be transmitted is a retransmitted packet or a new packet. In addition, some information may be generated for indicating the redundancy version of the transmitted packet and others. The redundancy version for step S14 and the redundancy version for step S24 may be determined independently. Also, they may be set to be different versions or the same version.

At steps S15 and S25, a physical channel is assigned to each of the divided transmitted data sequences, and an encoded symbol is assigned to each frequency block. This operation is mainly conducted in the radio resource assignment unit 702. It is determined in frequency scheduling which frequency block is assigned to the symbol of which user.

At steps S16-1 to S16-K and S26-1 to S26-L, data modulation is carried out for each frequency block for generating a transmission symbol. Note that K and L represent the total number of frequency blocks in the respective sequences. Subsequently, some operation (not shown) is conducted for radio transmission of the transmission symbol.

In the illustration in FIG. 20, since a modulation scheme is determined for each divided sequence for each frequency block, the transmission rate is set to have a value suitable for each frequency block. Thus, the illustrated exemplary operation is preferable from the viewpoint of improved transmission throughput.

Figure 21:
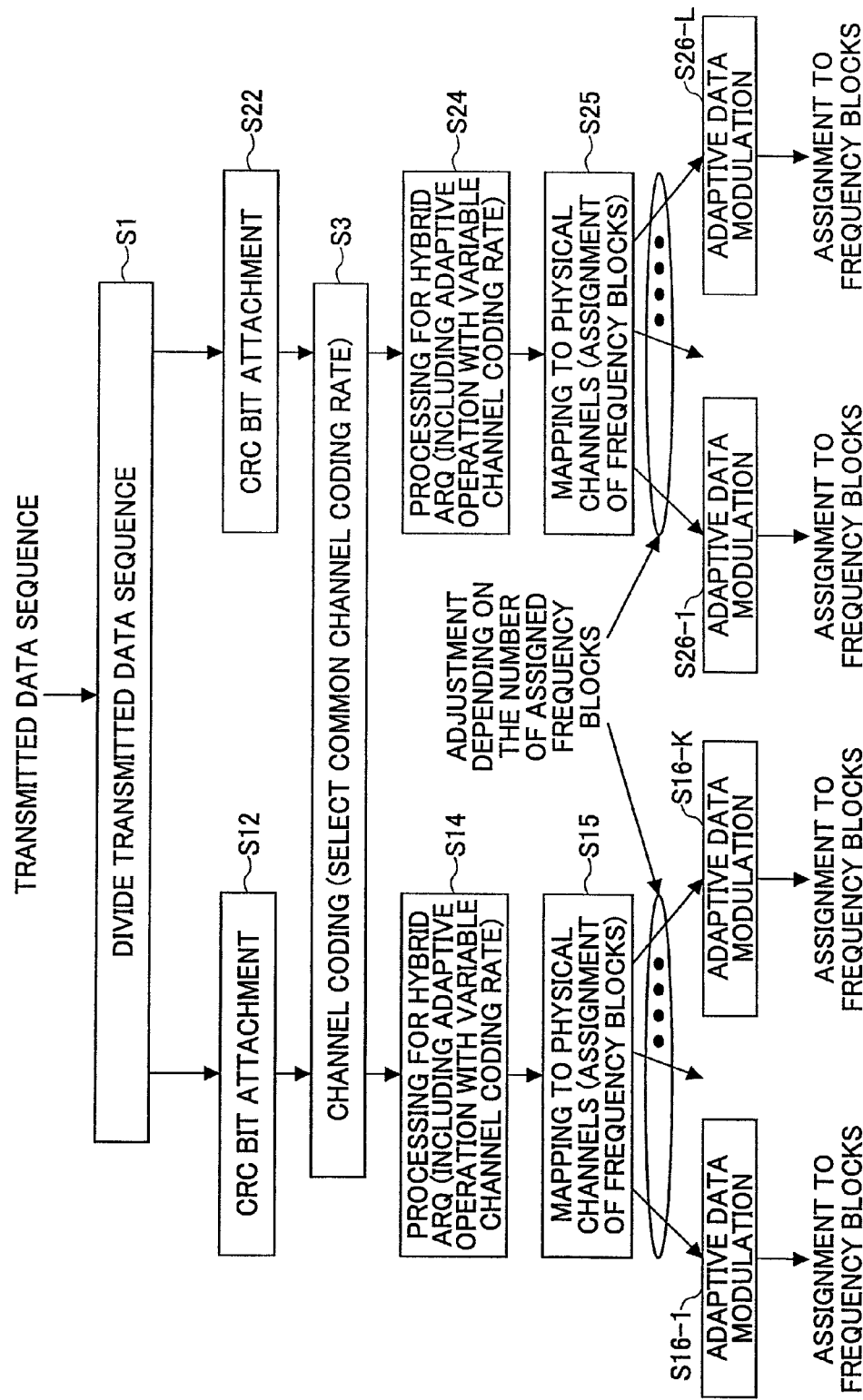
FIG. 21 is a flowchart (1)' for explaining an exemplary transmission procedure.

FIG. 21 is a flowchart (1)' illustrating an exemplary transmission procedure. This flowchart is the same as FIG. 20 except for step 3. In the illustration, the two divided transmitted data sequences are separately channel encoded, but the respective channel coding rates are set to have a uniform value (R1=R2). Since the same channel coding rate is used for the respective sequences, it is possible to reduce the number of control bits required to report the channel coding rate to the receiver side.

Figure 22:
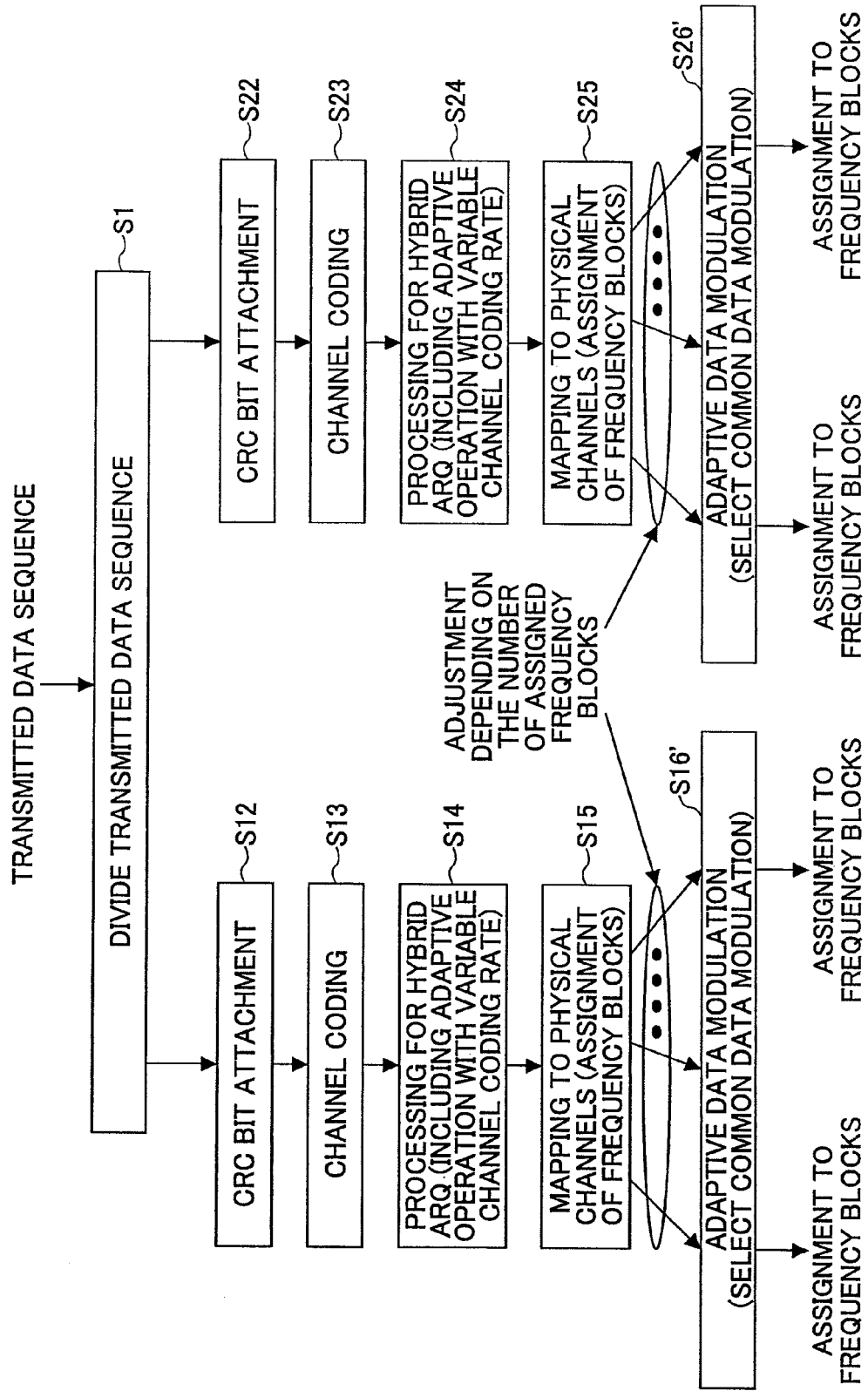
FIG. 22 is a flowchart (2) for explaining an exemplary transmission procedure.

FIG. 22 is another flowchart (2) illustrating a transmission procedure. The operation subsequent to division at step S1 is the same as the flowchart (2) in FIG. 12C. This flow is the same as the flow in FIG. 20 except for steps S16' and S26'. In the illustration, modulation schemes are determined for two divided sequences of transmitted data independently, but the same modulation scheme is applied to the same data sequence. In the illustration in FIG. 20, however, different modulation schemes may be applied to different frequency blocks. Since the same modulation scheme is applied to plural frequency blocks, it is possible to reduce the number of control bits required to report the modulation scheme to the receiver side.

Figure 23:
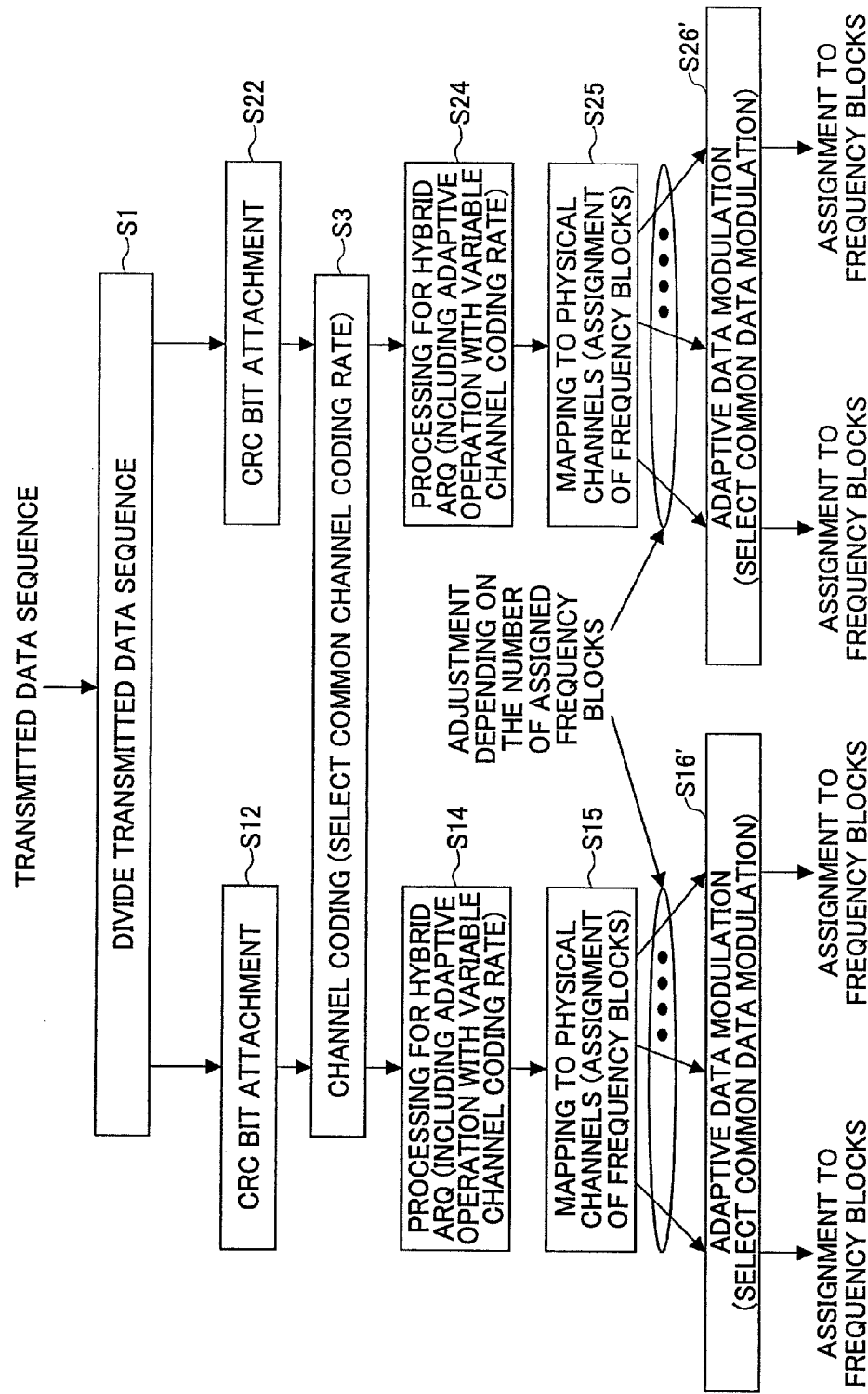
FIG. 23 is a flowchart (2)' for explaining an exemplary transmission procedure.

FIG. 23 is a flowchart (2)' illustrating an exemplary transmission procedure. This flow is the same as the flow in FIG. 22 except for step S3. In the illustration, channel coding is performed on the two divided sequences of transmitted data separately, but the same channel coding rate is set for them (R1=R2). Also, the same modulation scheme is applied to the same data sequence. Since the same channel coding rate is applied to the different sequences and the same modulation scheme is applied to plural frequency blocks, it is possible to reduce the number of control bits required to report the channel coding rate and the modulation scheme to the receiver side.

Figure 24:
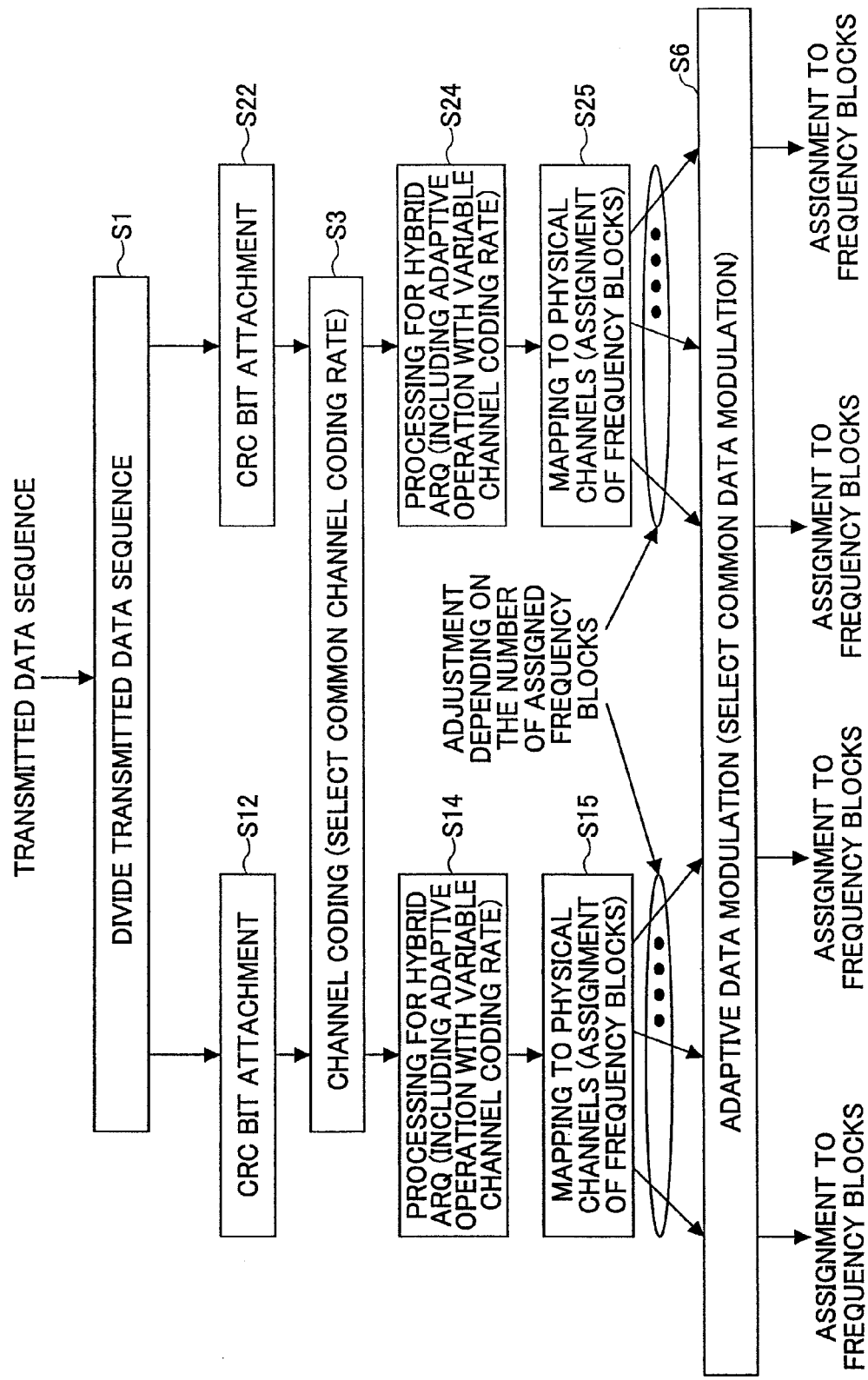
FIG. 24 is a flowchart (2)" for explaining an exemplary transmission procedure.

FIG. 24 is another flowchart (2)" illustrating an exemplary transmission procedure. This flow is the same as the flow in FIG. 23 except for step S6. In the illustration, channel coding is performed on the two divided sequences of transmitted data separately, but the same channel coding rate is set for them (R1=R2). Also, the same modulation scheme is applied to the data sequences. Since the same channel coding rate is applied to different sequences and the same modulation scheme is applied to all frequency blocks, it is possible to further reduce the number of control bits required to report the channel coding rate and the modulation scheme.

Figure 25:
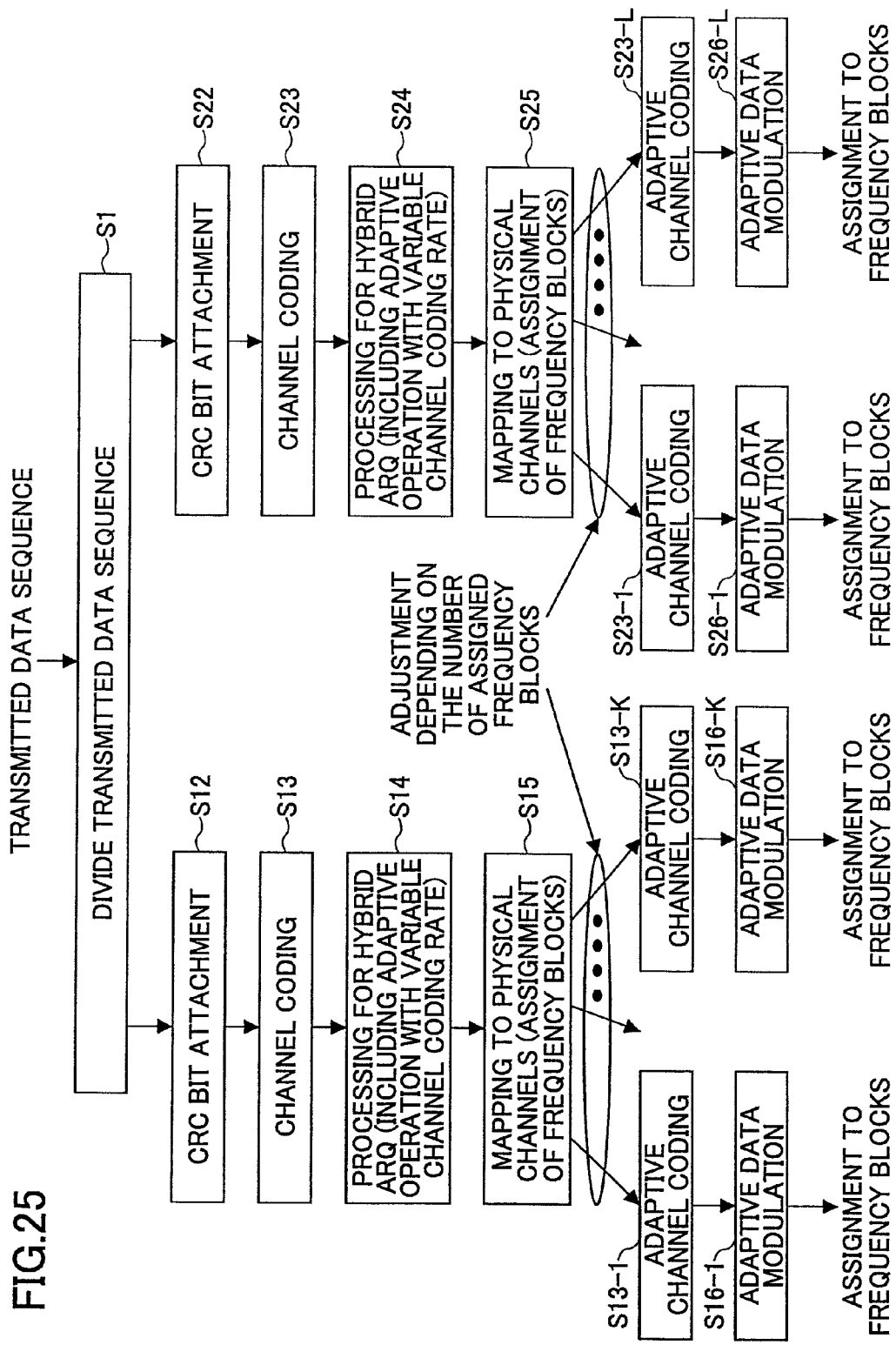
FIG. 25 is a flowchart (3) for explaining an exemplary transmission procedure.

FIG. 25 is another flowchart (3) illustrating an exemplary transmission procedure. The operation subsequent to the division at step S1 is the same as the flowchart (3) in FIG. 12D. Also, this flow is the same as the flow in FIG. 20 except for steps S13-1 to S13-K and S23-1 to S23-L. In the illustration, channel coding may be performed on each frequency block. In order to simplify the operation and decode data for individual frequency blocks with the similar accuracy, it is preferable to transmit signals in accordance with the procedures illustrated in FIGS. 20-24.

[Third Embodiment]

The division of a data sequence to be transmitted into plural sequences maybe conducted by means of various products and applications under various processing environments. In the third embodiment of the present invention, the data sequence to be transmitted is divided corresponding to plural reception antennas.

Figure 26:
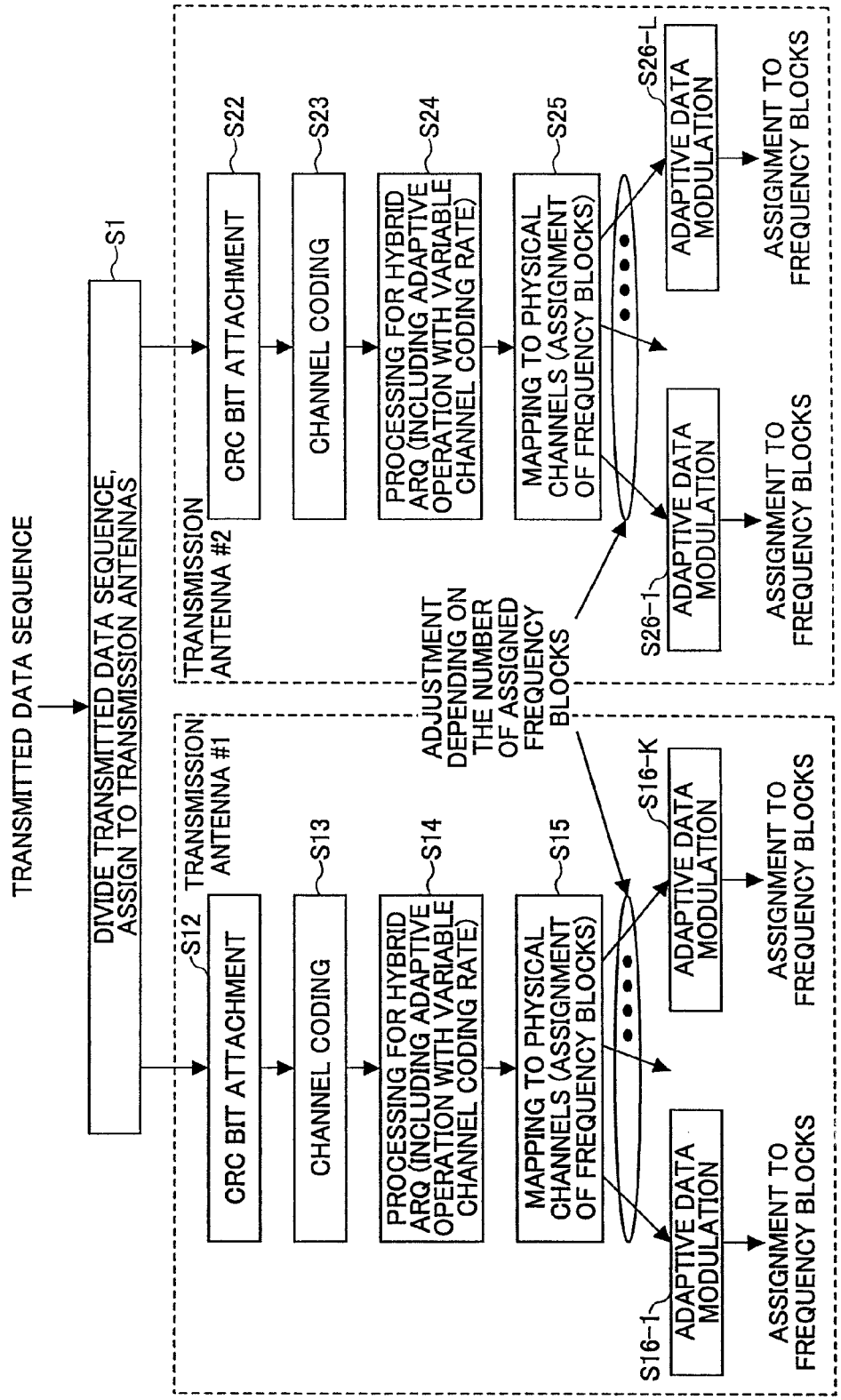
FIG. 26 is a flowchart (1) for explaining an exemplary transmission procedure.

FIG. 26 is a flowchart (1) illustrating an exemplary transmission procedure according to the third embodiment.

Conventionally, a data sequence is finally transmitted from a single transmission antenna. According to the illustration in FIG. 26, divided data sequences are transmitted from different transmission antennas #1 and #2. Similar to the case of FIG. 20, the number of divided sequences may be set to be an arbitrary value, that is, any number of transmission antennas may be provided. In addition, the operation associated with a single transmission antenna (for example, transmission antenna #1) in FIG. 26 may be replaced with any of the operations described in conjunction with FIGS. 20-25. In other words, a data sequence transmitted from a single transmission antenna may be divided into plural data sequences. In this case, such a data sequence to be transmitted is divided into a larger number of data sequences than the number of transmission antennas. According to the third embodiment, in the case where data transmission is carried out in accordance with a MIMO multiplex scheme by means of a multi-antenna device with plural transmission antennas, a channel coding rate is set for each of the transmission antennas and a modulation scheme is set for each frequency block. This procedure is preferred from the viewpoint of improved throughput.

Figure 27:
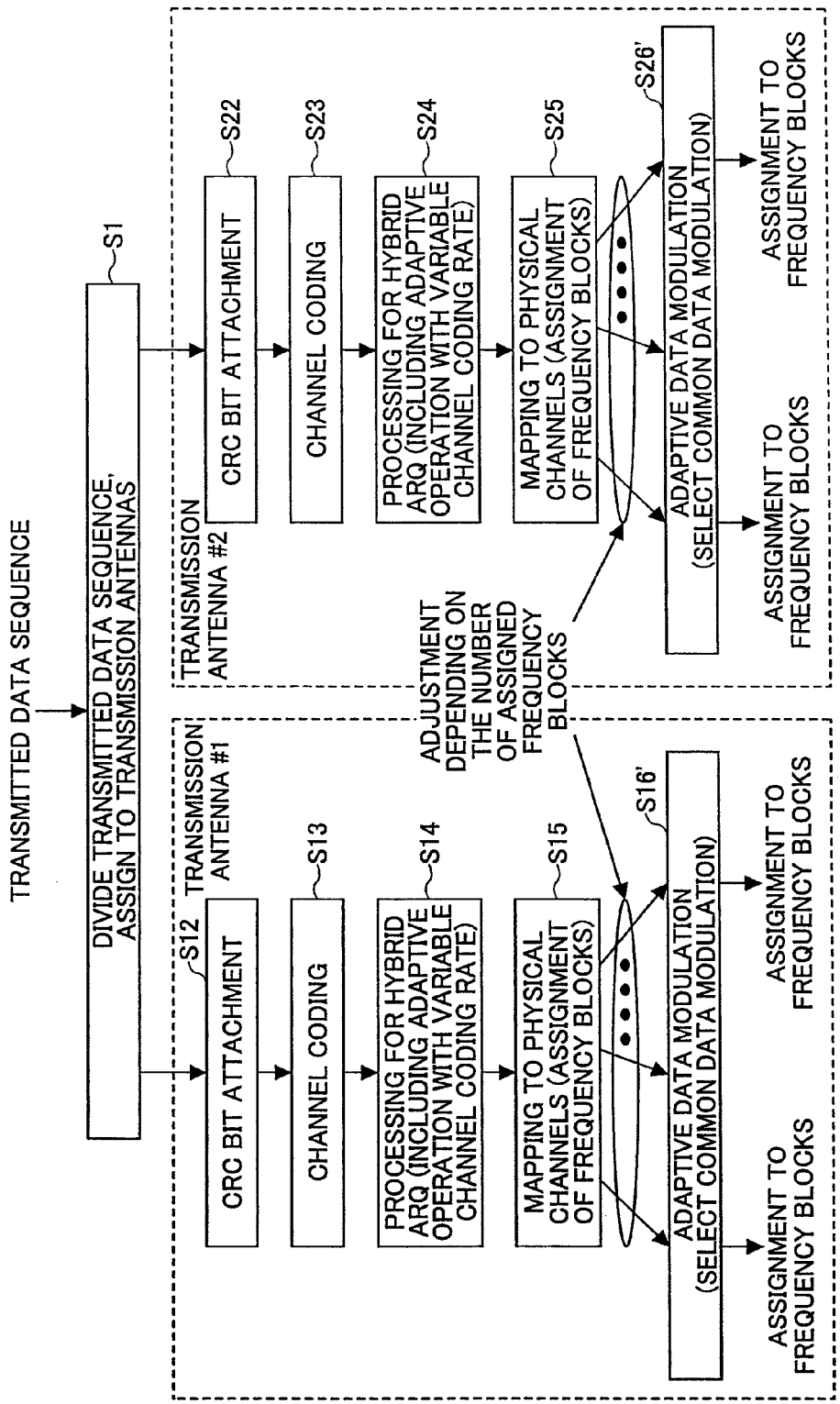
FIG. 27 is a flowchart (2) for explaining an exemplary transmission procedure.

FIG. 27 is another flowchart (2) illustrating an exemplary transmission procedure. This flow is the same as the flow in FIG. 22 except that divided different data sequences are transmitted from the different transmission antennas #1 and #2. In the illustration, for data transmitted from the same transmission antenna, the same modulation scheme is applied to plural frequency blocks (all frequency blocks in the illustration). Thus, it is possible to reduce the number of control bits required to report the modulation scheme to the receiver side. Since this reducing advantage grows proportionately to the number of transmission antennas, the number of control bits may be further significantly reduced compared to the second embodiment.

Figure 28:
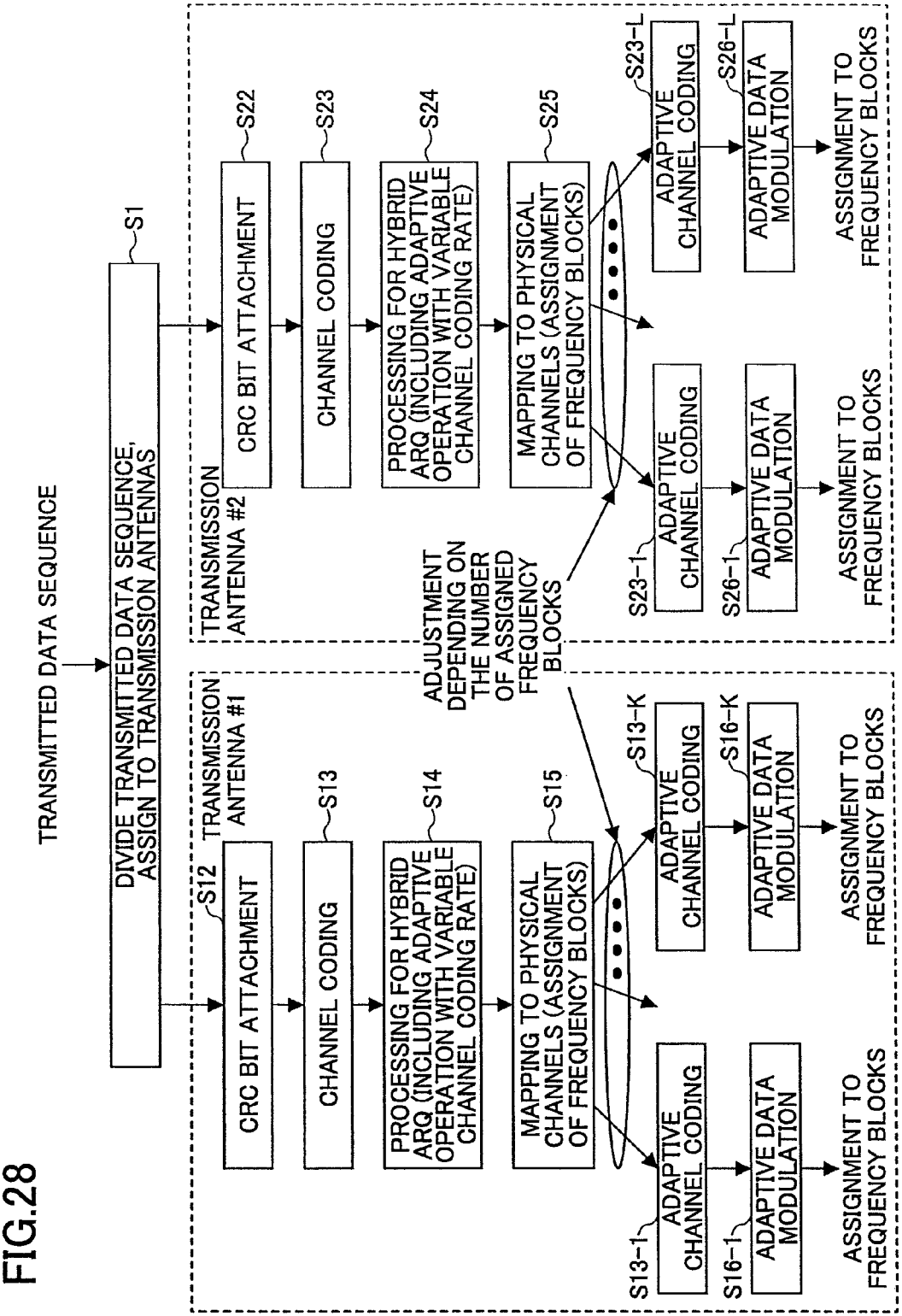
FIG. 28 is a flowchart (3) for explaining an exemplary transmission procedure.

FIG. 28 is another flowchart (3) illustrating an exemplary transmission procedure. This flow is the same as the flow in FIG. 25 except that divided different data sequences are transmitted from different transmission antennas #1 and #2.

[Fourth Embodiment]

Similar to the third embodiment, the fourth embodiment of the present invention also relates to the multi-antennas scheme.

Figure 29:
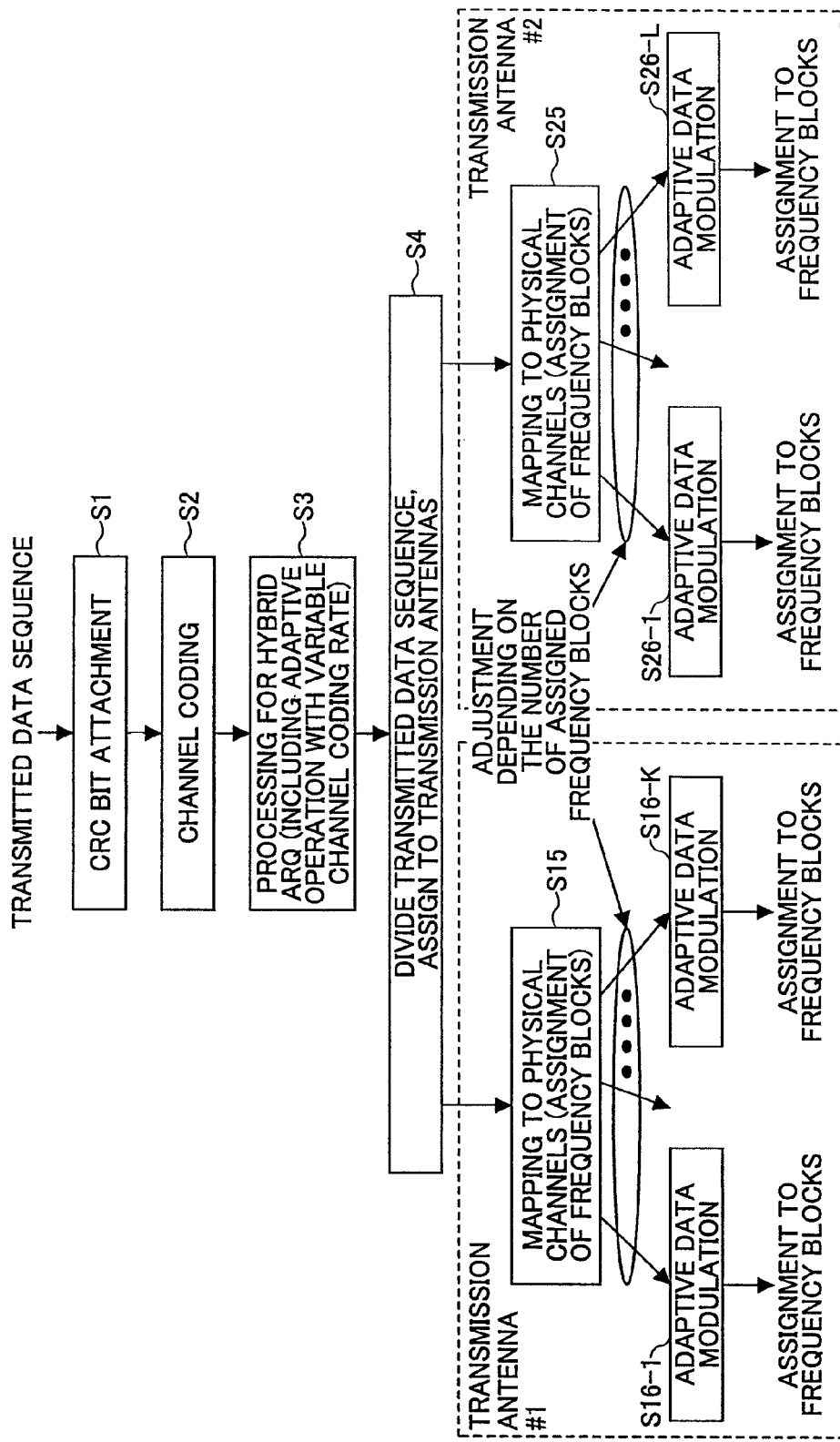
FIG. 29 is a flowchart (1) for explaining an exemplary transmission procedure.

FIG. 29 is a flowchart (1) illustrating an exemplary transmission procedure. The individual steps have been already explained in detail, and thus the duplicative description thereof will be omitted. In this embodiment, before a data sequence is divided for respective transmission antennas, attachment of a CRC bit, channel coding and retransmission control are carried out uniformly over the all the transmission antennas. As a result, the attachment of a CRC bit and the channel coding are performed on a packet with a relatively large data size. Subsequently, this packet is divided and transmitted via the transmission antennas. According to this embodiment, it is possible to reduce the number of control bits required to report the channel coding rate to the receiver side and provide the CRC bit.

Figure 30:
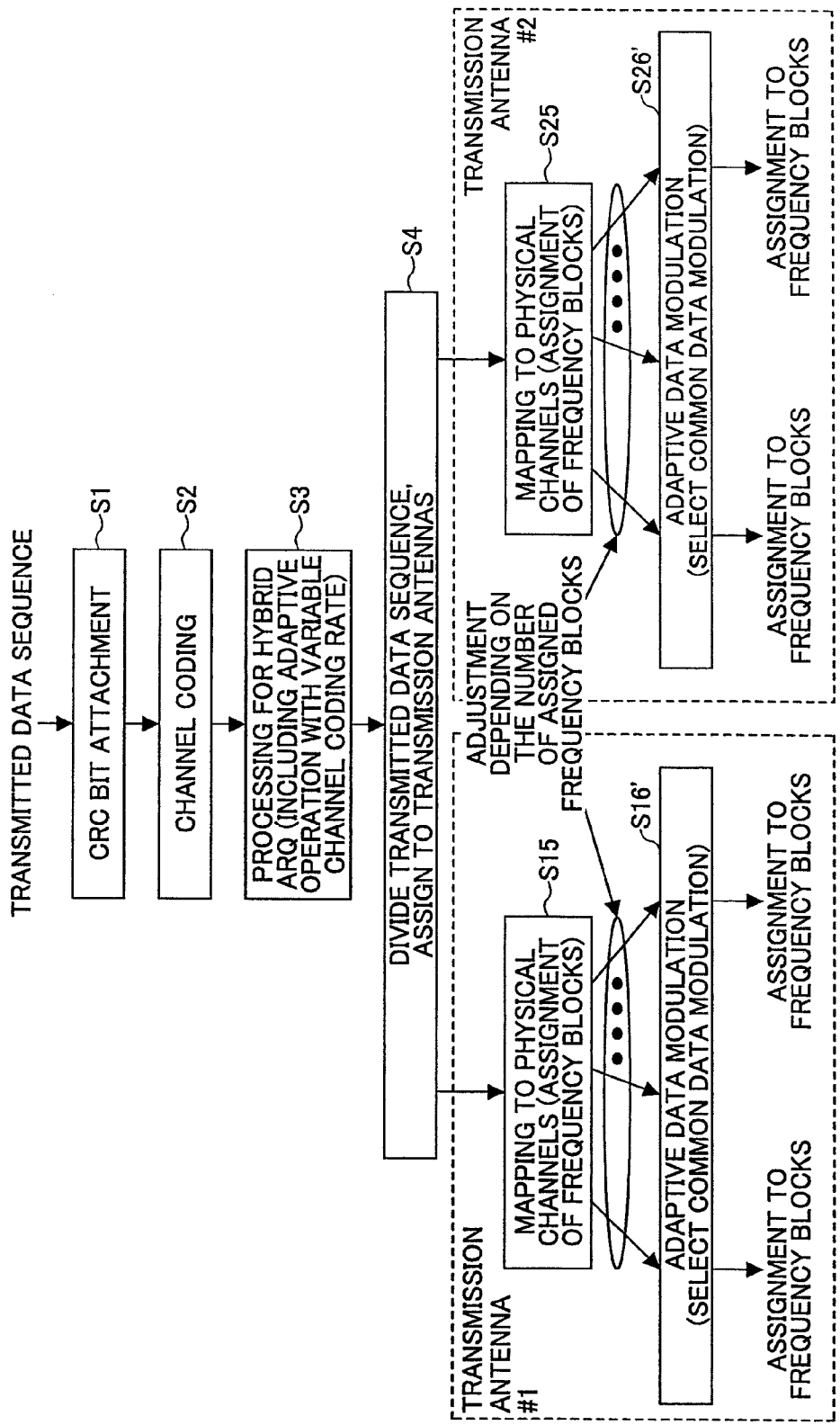
FIG. 30 is a flowchart (2) for explaining an exemplary transmission procedure.

FIG. 30 is a flowchart (2) illustrating an exemplary transmission procedure. In this flow, the attachment of a CRC bit, the channel coding and the retransmission control are carried out uniformly over all transmission antennas as in FIG. 29. However, the same modulation scheme is applied to data transmitted from the same transmission antenna regardless of frequency blocks. Since the same modulation scheme is applied to plural frequency blocks, it is possible to reduce the number of control bits required to report the modulation scheme to the receiver side.

Figure 31:
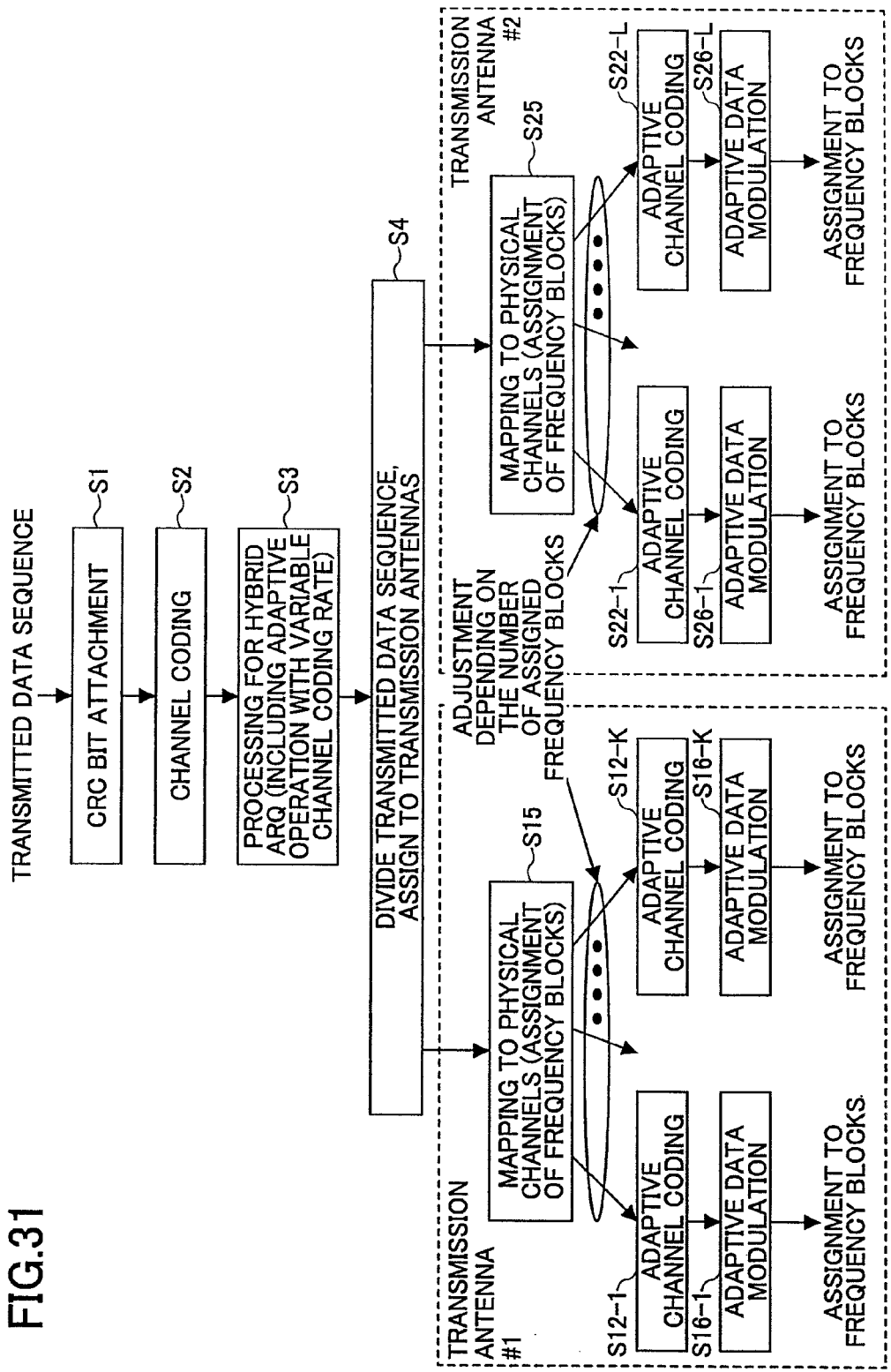
FIG. 31 is a flowchart (3) for explaining an exemplary transmission procedure.

FIG. 31 is a flowchart (3) illustrating an exemplary transmission procedure. In this flow, the attachment of CRC bits, the channel coding and the retransmission control are carried out uniformly over all transmission antennas as in FIG. 29. In the illustration, the modulation scheme is not only determined for each frequency block but also the channel coding rate is determined for each frequency block.

[Fifth Embodiment]

As stated above, adaptive modulation coding (AMC) is controlled in transmission of shared data channels. As illustrated in FIG. 1, transmission power is kept constant under the AMC control. That is intended to maintain signal quality by communicating under a combination (MCS) of a modulation scheme and a coding scheme suitable for the channel condition. In order to maintain good signal quality even under various channel conditions, it is desirable to prepare various MCSs as illustrated in FIG. 2. If there are not a sufficient number of MCS combinations, lower data transmission efficiency (throughput) can be achieved particularly under the condition where switching between MCSs is carried out.

On the other hand, for different combinations of modulation schemes and coding schemes, signal processing (encoding, decoding, modulation, demodulation and others) also differs at the transmitter side and the receiver side. Thus, if there are a large number of MCSs, the number of modification times of signal processing schemes and computational workload may also increase. This is not desirable from the viewpoint of simplification of the signal processing (particularly for simple communication terminals). The fifth embodiment of the present invention can address the above-mentioned problem.

Figure 32:
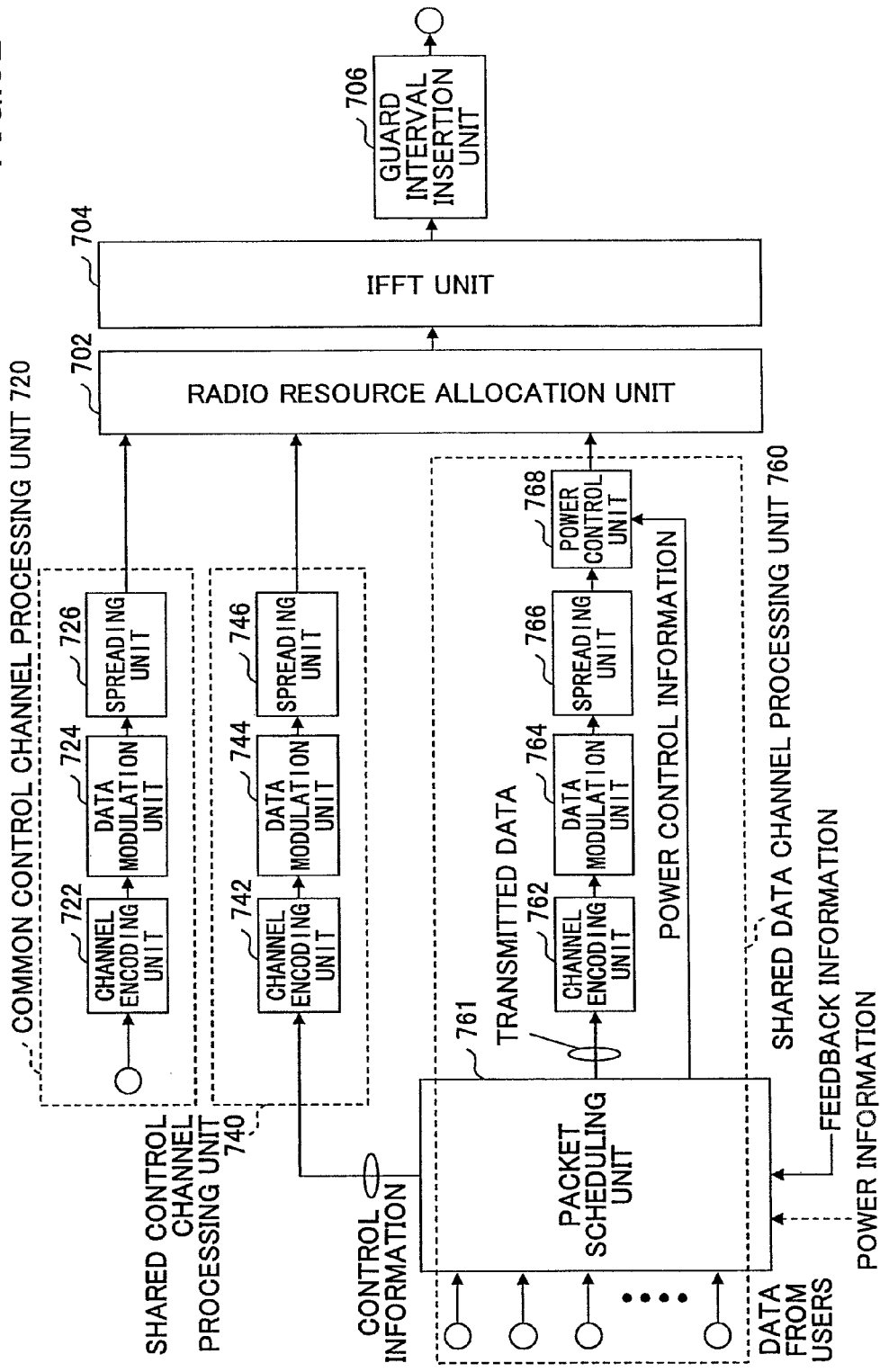
FIG. 32 is a block diagram illustrating a transmitter according to one embodiment of the present invention.

FIG. 32 is a block diagram illustrating a transmitter according to this embodiment. This transmitter is the same as the transmitter described above in conjunction with FIG. 7 except that a shared data channel processing unit 760 in FIG. 32 includes a power control unit 768. Although some components for setting transmission power for common control channels and shared control channels may be provided, these components do not relate to the present invention directly and thus are not illustrated. Note that the channel coding rate, the modulation scheme and the transmission power are kept constant for the common control channels. Also for the shared control channels, the channel coding rate, the modulation scheme and the transmission power are kept constant in general. The transmission power for the shared control channels may be controlled in accordance with open-loop or closed-loop transmission power control or based on reception quality (CQI information) of downlink pilot channels reported from mobile stations.

The power control unit 768 adjusts the transmission power for data channels based on power control information supplied from the packet scheduling unit 761. In this embodiment, the combination of a modulation scheme and a coding scheme for the data channels is adjusted under the AMC control if needed, and in addition, transmission power for data channels is also controlled. The power control information includes information for specifying transmission power of shared data channels for each resource block (frequency block). The power control information is determined by the packet scheduling unit 761. The power control information may be derived based on a correspondence predetermined between modulation schemes (or MCSs) and transmission power levels. Alternatively, the power control information may be found without use of such a predetermined correspondence. The power control information may be updated for each subframe (or TTI) or may be more or less frequently updated.

FIG. 33 shows an exemplary correspondence available to the case where the power control information is derived based on a predefined correspondence. In the illustration, the transmission power P1 is used in case of the modulation scheme being QPSK. The transmission power P2 is used in case of the modulation scheme being 16 QAM. The transmission power P3 is used in case of the modulation scheme being 64 QAM. There may be some or no relationship among the transmission power levels P1, P2 and P3. For example, there may or may not be some ratio relationship such as "P2=2P1 and P3=3P1". Of course, the data modulation schemes and/or the transmission power levels are not limited to the above three types, and may have more or less types. In addition, the modulation scheme and the transmission power may or may not have one-on-one correspondence to each other. For example, the same transmission power P1 may be used for both QPSK and 16 QAM. FIG. 34 shows an exemplary correspondence between MCSs and transmission power levels. The correspondence is not limited to the illustrations in FIGS. 33 and 34, and any other correspondence may be predefined. It is sufficient that the transmission power can be derived from the modulation schemes and others.

Figure 35A:
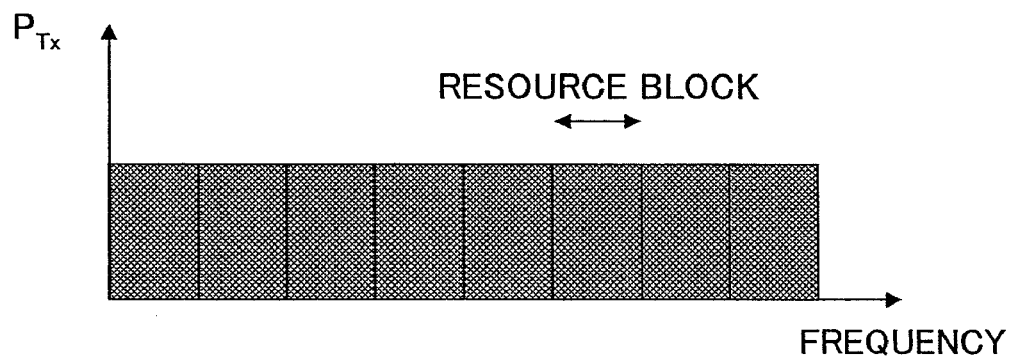
FIG. 35A is a diagram illustrating transmission power levels of different resource blocks in case of a conventional AMC control.
Figure 35B:
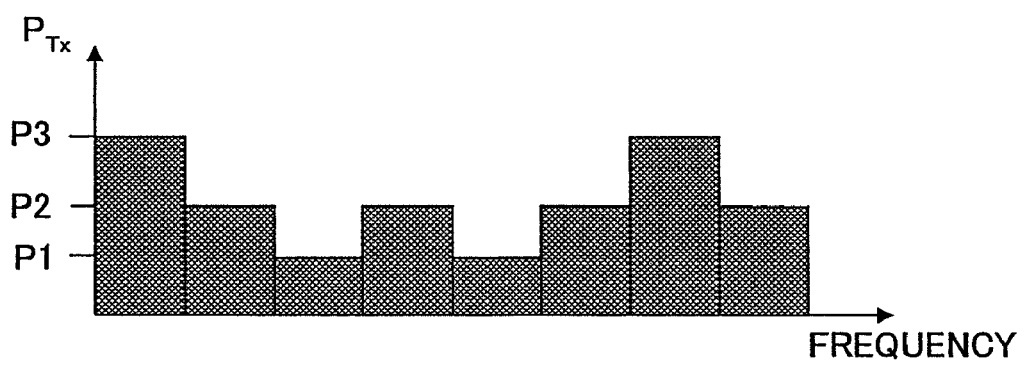
FIG. 35B is a diagram illustrating transmission power levels of different resource blocks in case of AMC control and transmission power control according to an embodiment of the present invention.

FIGS. 35A and 35B show exemplary transmission power for individual resource blocks. In FIG. 35A, the same transmission power level is set for all resource blocks, which corresponds to case of transmission power under the conventional AMC control. FIG. 35B illustrates an exemplary case where the AMC control as well as the transmission power level is set for each resource block. Since not only MCSs but also the transmission power can be adaptively changed, the throughput can be further improved compared to the case with use of only the AMC control.

Figure 36:
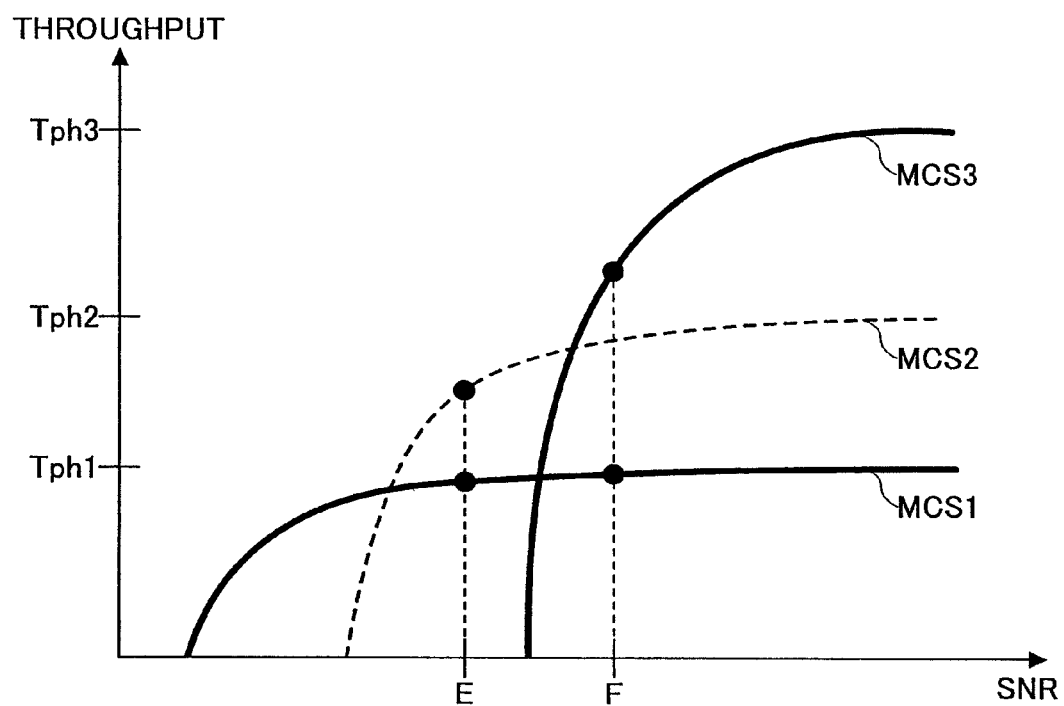
FIG. 36 is a schematic diagram illustrating an exemplary relationship between throughputs achievable in MCS1, MCS2, MCS3 and different signal-to-noise ratios.

FIG. 36 schematically shows an exemplary relationship between throughputs achievable under predefined MCSs and signal-to-noise ratios (SNRs). Suppose that MCS1 has a lower bit rate than MCS2 and in turn MCS2 has a lower bit rate than MCS3. Let the maximum throughputs achievable under MCS1, MCS2 and MCS3 be Tph1, Tph2 and Tph2, respectively. Also, suppose that the SNR under a certain transmission power level is equal to the value "E" in the illustration. In this case, the throughput achievable under MCS1 is approximately Tph1, whereas throughput higher than Tph1 may be achievable under MCS2. However, suppose that MCS2 is not provided in the system and only the MCS1 and MCS3 are provided in the system. In this case, according to the conventional AMC control, when the SNR is equal to E, only MCS1 can be adopted in the system. On the other hand, according to this embodiment, higher transmission power is achieved. For example, it is possible to increase the SNR from E to F. Once the SNR is equal to F, MCS3 together with MCS1 become available. By using MCS3, higher throughput is achieved. In other words, according to this embodiment, even if only the MCS1 and MCS3 are provided in a system among the three types of MCSs, that is, MCS1, MCS2 and MCS3, higher throughput is achieved. In other words, it is possible to use variable transmission power to reduce the kinds of MCSs while maintaining high throughput.

As stated above, the level of transmission power may be derived based on a predefined correspondence between modulation schemes or others and transmission power levels. Alternatively, it may be found without use of such a predefined correspondence. In the former, power information indicative of the predefined correspondence is stored as common information between a base station and a mobile station in respective memories. The mobile station can determine the transmission power for an MCS reported from the base station with reference to the correspondence. In this case, the base station does not have to transmit the information indicative of the transmission power via shared control channels or others. The predefined correspondence may be reported to the mobile station via a common control channel such as broadcast information. Alternatively, the correspondence may be reported to the mobile station as layer 3 information at call setting time or may be written in ROM as system specific information.

On the other hand, without such a predefined correspondence, when assigning individual resource blocks to users, the base station may derive the transmission power individually so to as facilitate the best throughput. Since the MCS as well as the transmission power is optimized, this method is particularly advantageous to improve achievable throughput. Note that information for indicating which resource block has been used for transmission via a data channel at what level of the transmission power has to be reported to mobile stations via shared control channels.

Also, if the predefined correspondence is not used, the base station does not have to report the transmission power to mobile stations via shared control channels. For example, the mobile stations may measure reception quality of individual resource blocks assigned for themselves, and may estimate the transmission power.

Hence, the frequency of how often assignment status of resource blocks (information indicating which resource blocks are assigned for which users) is reported to mobile stations may be reported for each subframe (TTI) or less frequently. More generally, the respective frequency of reporting to mobile stations may or may not be the same for all or a portion of the resource block assignment status, the MCS number and the transmission power. A shared control channel may be used for the reporting.

Figure 37:
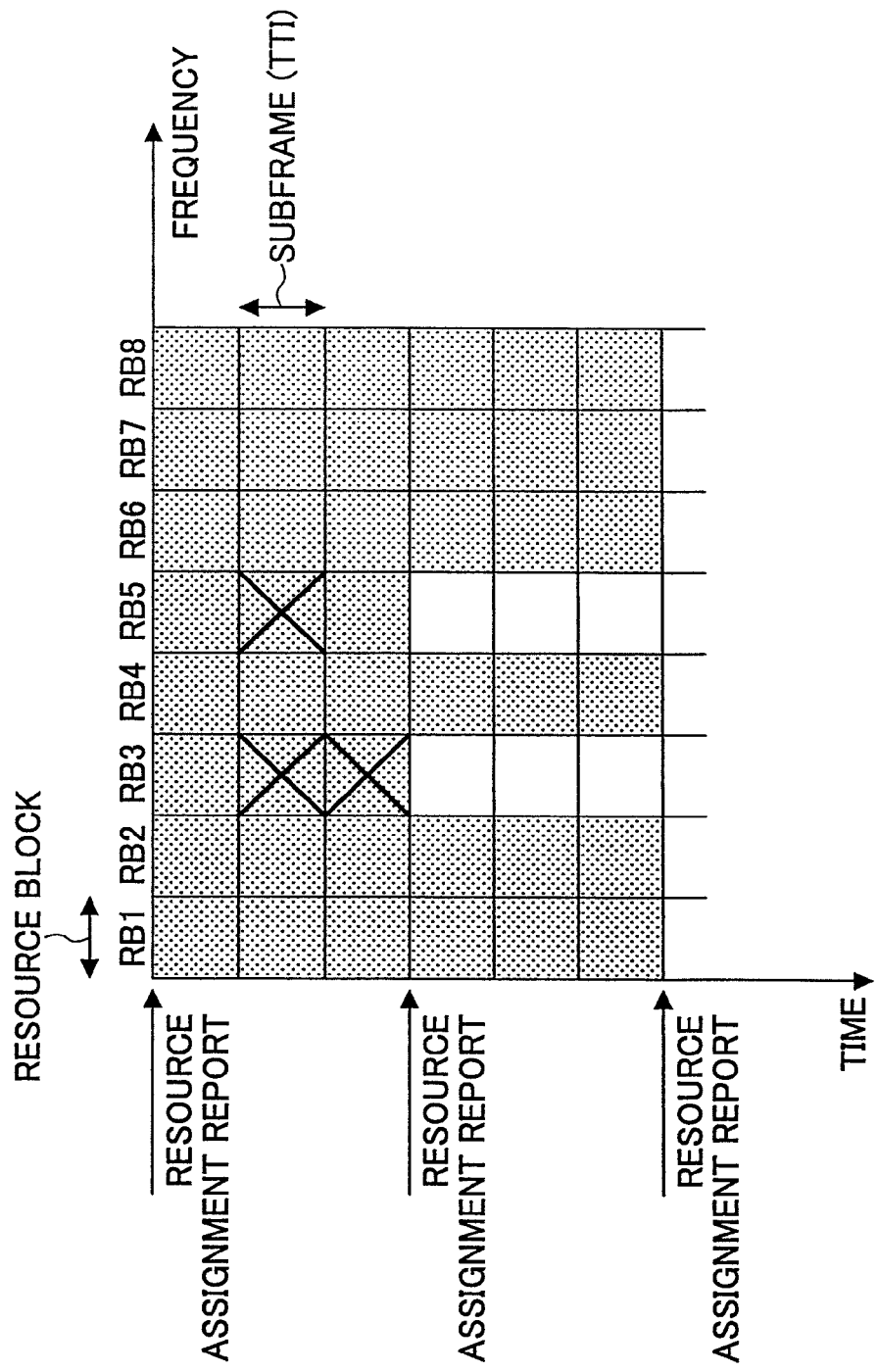
FIG. 37 is a schematic diagram illustrating exemplary assignment of resource blocks.

FIG. 37 schematically shows an exemplary assignment of resource blocks. In the illustration, shaded resource areas are assigned for certain users. In the illustrated example, assignment status of resource blocks is reported to mobile stations every three subframes (resource assignment report), and the assignment is modified if needed. In other words, the resource block assignment status is invariantly maintained during the three subframes. Although a resource block is assigned for a user with a better channel condition, there is no guarantee that the good channel condition is maintained throughout all resource blocks during the three subframes. In some cases, the channel condition may change into a worse condition. In the illustration, "×" marked resource blocks indicate that their channel condition has become worse. The "×" marked resource blocks should not be used as data channels for transmission. In this embodiment, the transmission power for these resource blocks may be set to be zero to prevent the resource blocks from being used. Thus, even if assignment of the resource blocks is infrequently updated, unnecessary data transmission can be avoided by setting the transmission power for resource blocks with poor channel condition to be zero.

Figure 38:
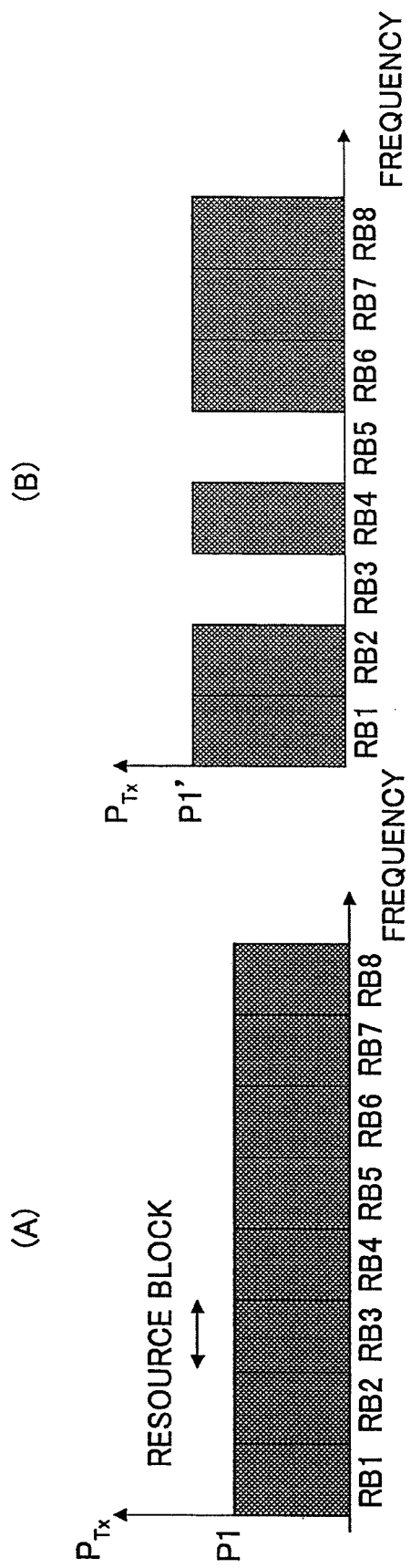
FIG. 38 is a diagram illustrating exemplary transmission power levels of individual resource blocks.
Figure 39:
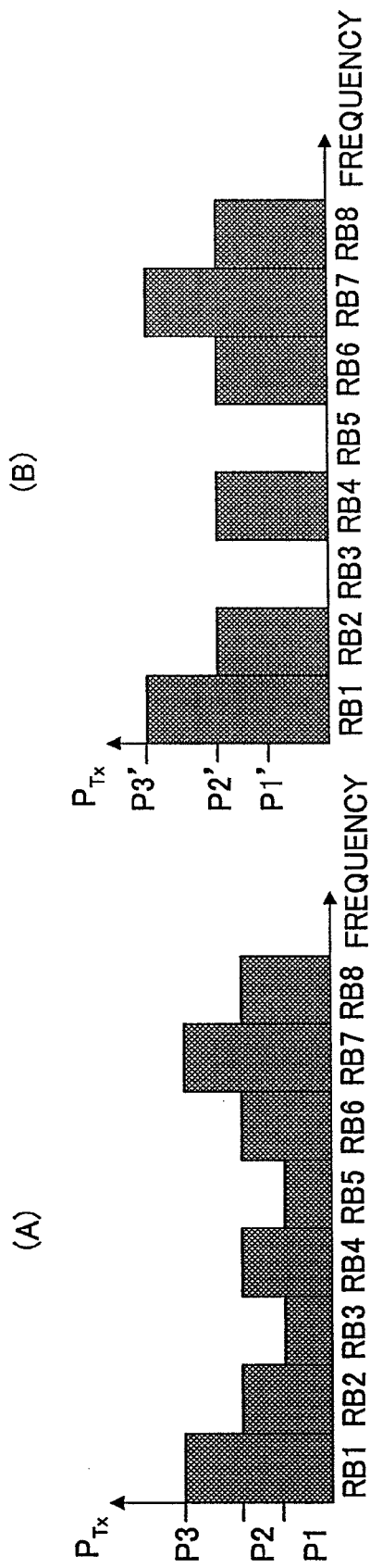
FIG. 39 is another diagram illustrating exemplary transmission power levels of individual resource blocks.

The setting of the transmission power to zero if needed is also advantageous to mobile stations together with efficient utilization of communication resources. This is explained in detail with reference to FIGS. 38 and 39. FIG. 38A schematically shows an exemplary case where some data are transmitted at the same transmission power in all the eight resource blocks assigned for certain users. This corresponds to the case of the conventional AMC control and is the same as FIG. 35A. FIG. 38B shows an exemplary case where the transmission power for recourse blocks RB3 and RB5 is set to be zero. In this case, it is desirable that a base station raise the transmission power associated with resource blocks other than the resource blocks RB3 and RB5 as well as keep the total amount of transmission power as constant as possible. This is why the total transmission power level at the base station should be maintained as constant as possible from the viewpoint of stable operation of a power amplifier. As a result, the transmission power is raised from P1 to P1'. From the viewpoint of mobile stations, it can be expected that reception quality associated with the resource blocks other than RB3 and RB5 is improved. FIGS. 39A and 39B show respective cases before and after the transmission power for the resource blocks RB3 and RB5 being set to zero. In the illustration, the transmission power is controlled as in the case of FIG. 35B. As illustrated in FIG. 39B, the transmission power is raised for each resource block.

Information indicating for which resource block the transmission power is set to be zero may be reported to mobile stations via any shared control channels other than shared control channels indicative of resource block assignment status. However, it is likely that such shared control channels are not necessarily provided. For example, mobile stations may intend to receive all the resource blocks assigned for themselves, and may ignore signals for resource blocks with less than a predefined reception quality (in the above example, RB3 and RB5). When the information indicating for which resource block the transmission power is equal to zero is reported to a mobile station, the mobile station can measure reception quality associated with each resource block with high accuracy based on the reported information, the total transmission power and reception power for the mobile station.

The preferred embodiments of the present invention have been described above. However, the present invention is not limited to these embodiments, and various modification and variations may be made within the scope and sprit of the present invention. For convenience, the present invention has been described with reference to the distinct embodiments. However, the distinction of the embodiments is not essential to the present invention, and one or more embodiments may be used if needed.

This international patent application is based on Japanese Priority Application No. 2005-106908 filed on Apr. 1, 2005, the entire contents of which are hereby incorporated by reference.

This international patent application is also based on Japanese Priority Application No. 2006-9299 filed on Jan. 17, 2006, the entire contents of which are hereby incorporated by reference.

This international patent application is also based on Japanese Priority Application No. 2006-31750 filed on Feb. 8, 2006, the entire contents of which are hereby incorporated by reference.

The invention claimed is:

1. A transmitter, comprising:
a division unit configured to divide a transmission data sequence into multiple sequences corresponding to multiple transmit antennas;
an attachment unit configured to attach a CRC (Cyclic Redundancy Check) bit to each of the resulting sequences from the division unit;
a channel coding unit configured to perform channel coding on each of the CRC bit attached sequences;
a hybrid ARQ (Automatic Repeat Request) processing unit configured to perform a hybrid ARQ operation on each of the channel coded sequences;
a mapping unit configured to map each of the resulting sequences from the hybrid ARQ processing unit into a frequency block; and
a modulation unit configured to perform adaptive data modulation on each of the mapped sequences,
wherein a channel coding rate applied for the channel coding is controlled per transmission time interval,
wherein the hybrid ARQ operation is controlled per the transmission time interval,
wherein the frequency block is scheduled in a frequency domain, the scheduling being controlled per frequency block, and
wherein a modulation scheme applied for the adaptive data modulation is controlled per the transmission time interval.

2. The transmitter as claimed in claim 1, wherein the attachment unit generates the CRC bit by performing error detection coding on physical layer control information and layer 2 control information together.

3. A transmitting method, comprising:
dividing a transmission data sequence into multiple sequences corresponding to multiple transmit antennas;
attaching a CRC (Cyclic Redundancy Check) bit to each of the resulting sequences from the division;
performing channel coding on each of the CRC bit attached sequences;
performing a hybrid ARQ (Automatic Repeat Request) operation on each of the channel coded sequences;
mapping each of the resulting sequences from the hybrid ARQ operation into a frequency block; and
performing adaptive data modulation on each of the mapped sequences,
wherein a channel coding rate applied for the channel coding is controlled per transmission time interval,
wherein the hybrid ARQ operation is controlled per the transmission time interval,
wherein the frequency block is scheduled in a frequency domain, the scheduling being controlled per frequency block, and
wherein a modulation scheme applied for the adaptive data modulation is controlled per the transmission time interval.

4. The transmitting method as claimed in claim 3, wherein the attaching comprises generating the CRC bit by performing error detection coding on physical layer control information and layer 2 control information together.

* * * * *